US007827055B1

(12) United States Patent
Snodgrass et al.

(10) Patent No.: US 7,827,055 B1
(45) Date of Patent: Nov. 2, 2010

(54) IDENTIFYING AND PROVIDING TARGETED CONTENT TO USERS HAVING COMMON INTERESTS

(75) Inventors: Ryan J. Snodgrass, Kirkland, WA (US); Michael McDaniel, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 3335 days.

(21) Appl. No.: 09/876,611

(22) Filed: Jun. 7, 2001

(51) Int. Cl.
*G06Q 30/00* (2006.01)
(52) U.S. Cl. ........................................................ 705/14
(58) Field of Classification Search ..................... 705/14
See application file for complete search history.

(56) References Cited

U.S. PATENT DOCUMENTS

| | | | | |
|---|---|---|---|---|
| 5,848,396 | A | * | 12/1998 | Gerace ......................... 705/10 |
| 5,948,061 | A | | 9/1999 | Merriman et al. |
| 6,016,504 | A | | 1/2000 | Arnold et al. |
| 6,029,141 | A | * | 2/2000 | Bezos et al. .................. 705/27 |
| 6,064,980 | A | * | 5/2000 | Jacobi et al. .................. 705/26 |
| 6,141,666 | A | | 10/2000 | Tobin |
| 6,307,965 | B1 | * | 10/2001 | Aggarwal et al. ........... 382/225 |
| 6,321,221 | B1 | | 11/2001 | Bieganski |
| 6,356,879 | B2 | * | 3/2002 | Aggarwal et al. ............. 705/26 |
| 6,460,036 | B1 | | 10/2002 | Herz |
| 6,460,072 | B1 | | 10/2002 | Arnold et al. |
| 6,963,850 | B1 | | 11/2005 | Bezos et al. |
| 2001/0014868 | A1 | | 8/2001 | Herz et al. |
| 2002/0120567 | A1 | | 8/2002 | Caplan et al. |

FOREIGN PATENT DOCUMENTS

| | | |
|---|---|---|
| WO | WO 99/45487 | 9/1999 |
| WO | WO 00/17792 | 3/2000 |
| WO | WO 00/62223 | 10/2000 |
| WO | 0125947 A1 | 4/2001 |

OTHER PUBLICATIONS

J. B. Schafer, J. Konstan, and J. Riedl, Recommender Systems in E-Commerce, ACM Conf. Electronic Commerce (EC-99), Denver, CO, pp. 158-166, Nov. 1999.*
Zaiane et al. (Discovering Web Access Patterns and Trends by Applying OLAP and Data Mining Technology on Web Logs, Proceedings of the Advances in Digital Libraries Conference, p. 19, Apr. 22-24, 1998).*

(Continued)

*Primary Examiner*—John Van Bramer
(74) *Attorney, Agent, or Firm*—Knobbe, Martens, Olson & Bear LLP

(57) ABSTRACT

A computer process is disclosed for selecting items to present or recommend to users based on the referring sites accessed by such users. The process includes tracking referrals of users from referring sites to a target site, and recording the item selections of the referred users from an electronic catalog of the target site. The process may also include analyzing the recorded item selections of the users to identify, for a particular subset of the referring sites, a set of items that correspond to group preferences of users referred to the target site by the subset of referring sites. These identified items may thereafter be presented to users who access a site that is a member of the subset of referring sites.

28 Claims, 14 Drawing Sheets

OTHER PUBLICATIONS

Zaiane et al. ,"Discovering Web Access Patterns and Trends by Applying OLAP and Data Mining Technology on Web Logs", Proceedings of the Advances in Digital Libraries Conference, Apr. 22-24, 1998, p. 19.*

Press Release titled Amazon.com Introduces "Purchase Circles(TM)," Featuring Thousands of Bestsellers lists for Hometowns, Workplaces, Universities, and More, dated Aug. 20, 1999 (note: details of an algorithm used to implement the Purchase Circles feature, as made available on the Amazon.com web site in Aug. of 1999. are described in the appendix of WO 00/62223, listed above).

PR Newswire titled "Linkshare launches affiliates profiling software," Dialog File 813 AN 1232636, dated Feb. 24, 1998.

Schafer et al., "E-Commerce Recommendation Applications," Data Mining and Knowledge Discovery, vol. 5, Nos. 1-2, Jan. 2001, pp. 115-153.

* cited by examiner

IDENTIFYING AND PROVIDING TARGETED CONTENT TO USERS HAVING COMMON INTERESTS

FIELD OF THE INVENTION

This invention relates to data processing and information filtering. More specifically, this invention relates to methods for identifying users that have common interests, and for generating and displaying information relevant to the interests of such users.

BACKGROUND OF THE INVENTION

With the increasing popularity of the Internet and the World Wide Web, it has become common for merchants to set up web sites for marketing and selling goods. One example merchant web site is an online store wherein customers may access and place orders from an online catalog that includes millions of products, such as, books, music, DVDs, toys, games, as well as a variety of other products and product groups. Customers may visit a merchant web site using a variety of methods, such as by directly accessing the web site or through interaction with a web site of one of the merchant's associates.

Some merchant web sites provide programs in which other entities, commonly referred to as "affiliates" or "associates," refer customers to the merchant's web site—typically in exchange for bounty payments or commissions on resulting sales. Typically, each associate sets up a web site having one or more links ("referral links") to the merchant's web site, although the referral links may alternatively be distributed by email or using any other suitable technology. The URL portion of each such link typically includes an associate identifier that allows the referring associate to be identified by the merchant, or by a third party program administrator, when a referral link is followed by a user. In some cases, the associates host the referral links together with descriptions, reviews, and/or recommendations of specific products or product groups, in which case the referral links may point to such products or product groups within the merchant's online catalog. In other cases, the referral links are simply in the form of advertisements, such as banner ads, that typically point to the merchant site's home page. For more information about associates programs, see U.S. Pat. No. 6,029,141 entitled "INTERNET-BASED CUSTOMER REFERRAL SYSTEM," the disclosure of which is hereby incorporated by reference. In some cases, the tasks of setting up and administering associate programs are performed in-whole or in-part by a third party service provider or program administrator, rather than the merchant.

In addition, merchants commonly provide services on their web site for assisting customers in browsing an online catalog and purchasing various products from the catalog. Such services may be invaluable to an online customer, particularly if the customer does not have an opportunity to physically inspect the merchants' products or to talk with a salesperson. One type of service involves automatically generated lists of the best selling or most popular items within a specific community or interest group. The communities may be formed based on information about registered customers of the merchant web site, such as, email address, shipping address, and so forth. For example, it is known to automatically generate and display lists of the top selling items among customers of a particular email domain, such as "NASA.GOV," or to customers within a particular zip code. These lists may be displayed to members of these "communities," and may also be made available for general viewing by the public.

While email-based communities and shipping-address-based communities offer some ways to provide targeted recommendations and content, such groupings are limited and may not adequately direct customers to relevant information. Furthermore, such groupings do not provide much guidance for unrecognized or unregistered customers.

SUMMARY OF THE INVENTION

The present invention includes a computer-implemented method that comprises tracking referrals of users from each of a plurality of referring web sites to a target web site that hosts an electronic catalog of items, the referrals resulting from user selections of links provided on the referring web sites. The method also comprises: identifying a group of users referred to the target web site by a selected subset of the plurality of referring web sites, said group comprising a plurality of users, and representing a subpopulation of a general user population of the target web site; and collecting user activity data reflective of preferences of particular users for particular items represented in the electronic catalog of items, the user activity data encompassing actions of both members and non-members of said group of users. The method further comprises: identifying a set of items that correspond to group preferences of the group of users, wherein the set of items is identified based on the collected user activity data of both the members and the non-members of said group of users; and causing the set of items to be displayed (a) on the target web site to users who are referred thereto from a referring web site in said subset of referring web sites, and/or (b) on a referring web site in said subset of referring web sites.

The invention also includes a computer system that comprises a referral tracking system that tracks referrals of users from a plurality of referring sites to a target site, the target site including an electronic catalog of items. The computer system also comprises a data repository that stores user activity data reflective of user actions performed with respect to items represented in the electronic catalog, the user activity data reflective of user preferences for particular items. The computer system also comprises a recommendations service configured to (a) identify a group of users that have been referred to the target site by a selected subset of the referring sites, (b) analyze the user activity data of both members and non-members of said group to identify a set of items that are significantly more popular in the group than in a general user population of the target site, and (c) cause the identified set of items to be suggested to users that visit a referring site in the subset of referring sites.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

A general architecture as well as services that implement the various features of the invention will now be described with reference to the drawings of various embodiments. The drawings and the associated descriptions are provided to illustrate embodiments of the invention and not to limit the scope of the invention. Throughout the drawings, reference numbers are reused to indicate correspondence between referenced elements. In addition, the first digit of each reference number indicates the figure in which the element first appears.

DETAILED DESCRIPTION OF THE PREFERRED EMBODIMENTS

I. Overview

Figure 1:
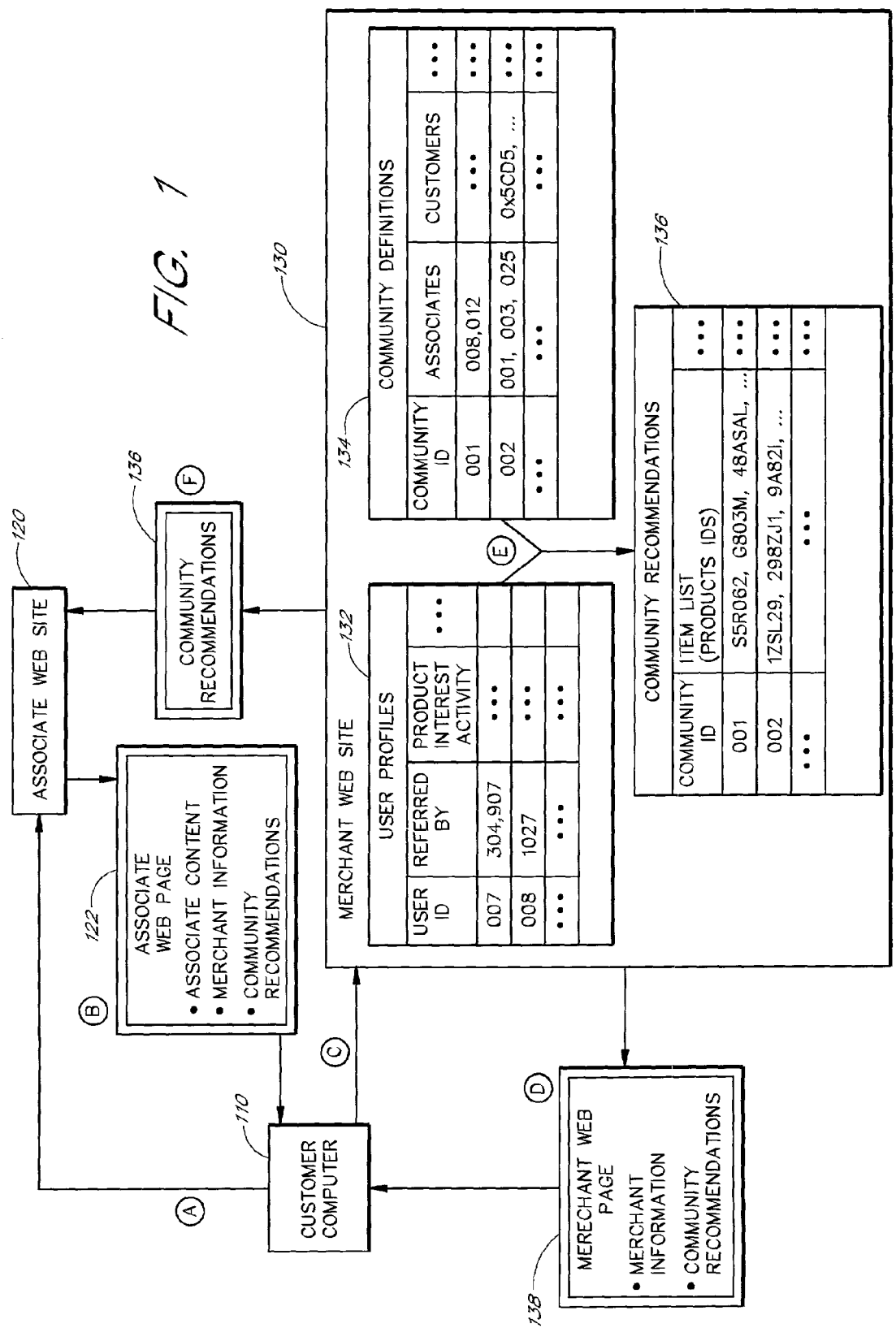
FIG. 1 illustrates one embodiment of a general architecture of an associate-based communities system and illustrates the flow of information among components of the system.

The present invention provides targeted and relevant information to customers of web sites wherein the information is prepared in part based upon the activity of customers referred by associates with common interests. FIG. 1 illustrates an example associate-based communities system wherein the arrows in FIG. 1 show the general flow of information among components of the system: a customer computer 110, an associate web site 120, and a merchant web site 130 which communicate via a communication medium such as the Internet (not shown).

In one embodiment, a customer accesses an associate web site 120 (event A) using a standard web browser and is presented with an associate web page 122 (event B). The associate web page 122 may include content about the associate, information about a merchant including one or more "referral" links to the merchant's web site, and community information. The referral link may be in a variety of forms such as a textual link, a banner ad, a graphic image, and so forth. In addition, it is recognized that the referral link may be a link to third party and does not have to be a direct link to the merchant web site. For example, the referral link can point to a third party web site that records the event and then redirects the request to the merchant web site.

The associate may also provide information about specific products sold by the merchant that relate to its web site along with referral links to product detail pages of the merchant web site. The customer is able to visit the merchant web site to find more information and/or to purchase the featured products from the merchant. For example, an associate that runs a golf school may include in its web site a referral link to a merchant web site that sells golf products, and may include information about and referral links to books for improving golf swings, maps of famous golf courses, as well as popular golf attire.

The customer may then select a referral link to access the merchant web site (event C). As noted above, depending on the referral link, the customer may be presented with a merchant web page 138 (event D), such as, the merchant's home page, an advertisement page, a product detail page, and so forth. After selecting a referral link to a product detail page of the merchant web site, for example, the customer may be presented with additional information about other products that may be of interest to the customer. The additional information may include a list of the merchant's recommended products, best-selling products, a list of on-sale items, and/or products recommended by other customers who have related interests. In addition, the web page 138 may be customized to include community-specific content. The community-specific content may include community recommendations, community highlights, and so forth.

When the customer selects a referral link, the identity of the referring associate is sent to the merchant web site. The merchant web site may then record the identity of the referring associate in the customer's user profile 132 or other repository. In other embodiments, the merchant web site may record the identity depending on whether the customer subsequently performs some type of activity such as purchasing a product or setting up an account. The merchant web site may also maintain customer-specific histories of the customers' activities. These activities, also referred to as "product interest activity" or "interest activity," may include, for example, purchases, product viewing, shopping cart selection, online bidding submissions, product rating, product downloads, and so forth.

Furthermore, the merchant may also group together one or more associates into a community 134. For example, a "Golf Enthusiasts" community may include customers referred by the "Unofficial Tiger Woods Fan Club" associate and the "Florida Golf Schools" associate. The referring associate data for the customers of the web site may then be used to assign customers to associate-based communities set up by the merchant. For example, all customers that were referred to the merchant web site by the Florida Golf Schools associate may be assigned to the Golf Enthusiasts community. Furthermore, the browsing history data for customers falling within a particular associate-based community may be analyzed periodically (event E) to identify lists of items that are popular within or characteristic of the community 136. The lists of items may reflect a variety of recommended items such as hot-selling items and most popular items.

The resulting community-specific recommendations 136 may be displayed in web pages 138 of the merchant site (event D) (e.g., community pages, product detail pages, etc.) and may be sent to associate web sites 120 as well (event F).

The merchant web site 130 may also provide various services for enabling users to browse, search, and make purchases from a catalog of several million book, music, DVD, and video titles. In addition, information about existing customers of the web site may be stored in the merchant web site 130 and may include the names, shipping addresses, email addresses, payment information, and product interest activity histories of the customers. Information that is stored for a given customer is commonly referred to as the customer's "user profile" 132.

To facilitate an understanding of one practical application, associate-based communities are described primarily in the context of a hypothetical system for assisting customers of a merchant web site 130 in locating and evaluating products within an electronic catalog. The products may include, for example, books, music, DVDs, and videos. It is recognized, however, that the system may be used in other environments such as the marketing and sales of other types of items. For example, in other embodiments, the items that are the subject of the services may be cars sold by an online car dealer, movies titles rented by an online video store, computer programs or informational content electronically downloaded to customer computers 110, or stock and mutual fund shares sold to online investors. Further, it should be understood that the "purchases" referred to herein need not involve an actual transfer of ownership, but may involve leases, licenses, rentals, subscriptions, and other types of business transactions. Purchases may also included non-business transactions that express preferences, such as, for example, customer reviews, customer ratings, customer bids, and so forth.

It is recognized that the "recommended" items may be presented based upon a variety of criteria such as, most popular, best selling, most unique to a community, most up-and-coming, and so forth. Furthermore, the criteria may be based upon factors which illustrate a customer's interest in an item. Items may be recommended based upon how frequently they are viewed, reviewed, rated, purchased, bid, and so forth by members of the community. Furthermore, items may be recommended based upon their inventory, price, profit amount, and so forth. Thus, the present systems and methods use the associate-based communities to help assist customers with finding relevant products.

The creation, maintenance, and use of the "associate-based communities" will now be described in further detail. The illustrated screen displays, data structures, architectures, and processing methods used to implement the disclosed functions are largely a matter of design choice, and may be varied without departing from the scope of the invention. Accordingly, the scope of the invention is defined only by the appended claims.

II. Associate-Based Communities

Communities based upon related associates are used to gather information about customers with similar interests. These communities are referred to herein as "associate-based communities." The associate-based communities may then be used to provide targeted recommendations or other targeted content to members of the associate-based communities as well as the general customer population.

The community recommendations service operates generally by tracking purchases of products and/or other customer activity within particular communities. The customer activity may include any activity that evidences a user's interest in a particular item or product ("product interest activity"). The following are examples of types of customer actions that may be included in addition to typical purchase histories.

(1) Placing an item in a personal shopping cart. With this method, products A and B may be treated as similar if a large percentage of those who put A in an online shopping cart also put B in the shopping cart. As with product viewing histories, the shopping cart contents histories or shopping cart selection histories of users may be evaluated on a per session basis (i.e., only consider items placed in the shopping cart during the same session), on a multiple-session basis (e.g., consider the entire shopping cart contents history of each user as a unit), or using another appropriate method (e.g., only consider items that were in the shopping cart at the same time).

(2) Placing a bid on an item in an online auction. With this method, products A and B may be treated as related if a large percentage of those who placed a bid on A also placed a bid on B. The bid histories of user may be evaluated on a per session basis or on a multiple-session basis. The table generated by this process may, for example, be used to recommend related auctions, and/or related retail items, to users who view auction pages.

(3) Placing an item on a wish list. With this method, products A and B may be treated as related if a large percentage of those who placed A on their respective electronic wish lists (or other gift registries) also placed B on their wish lists.

(4) Submitting a favorable review for an item. With this method, products A and B may be treated as related if a large percentage of those favorably reviewed A also favorably reviewed B. A favorable review may be defined as a score that satisfies a particular threshold (e.g., 4 or above on a scale of 1-5).

(5) Purchasing an item as a gift for someone else. With this method, products A and B may be treated as related if a large percentage of those who purchased A as a gift also purchased B as a gift. This could be especially helpful during the holidays to help customers find more appropriate gifts based on the gift(s) they've already bought.

The above examples provide a few of the activities that may be included as part of the product interest activity; it is recognized that other types of activity may also be included.

In one embodiment, customers are automatically assigned to associate-based communities based upon their referring associates data, and thus their product interest activity histories are used to create associate-based community recommendations. These customers are then considered "members" of the associate-based communities.

It is recognized that the associate-based communities may be implemented as implicit and/or explicit membership communities wherein members are automatically added to an associate-based community based upon their referral data, members are added based upon their affirmative assent to join a community. For example, a customer who visits an associate web site 120, but has yet to select a referral link may choose to join the communities associated with the associate web site 120, or the customer may be notified of a community that corresponds to an associate web site 120 he has visited and is then given the option to join.

In some embodiments, customers may be presented with the recommendations automatically (e.g., based on their referring associate data, visiting an associate web page, visiting a product detail page of one of the recommended items, etc.) or upon the customer's request (e.g., browsing the "communities" section of the merchant web site 130, signing up to receive community recommendations, etc.). These "presentation" preferences may be stored in the customer's user profile 132.

In one embodiment, the associate-based communities may be "composite" communities that are formed as the union of other, smaller communities, herein referred to as sub-communities. For example, there may be a composite community entitled "Golf Enthusiasts" which consists of the sub-communities "Tiger Woods Fans" and "Beginner Golfers." The "Golf Enthusiasts" composite community may include other members from related associates and may also include communities that are not associate-based communities. Further, it is recognized that a composite community may be a sub-community of another composite community. The composite communities may be defined by system administrators; alternatively, the composite communities may be defined automatically, such as by grouping together communities that have certain keywords in their titles.

In one embodiment, a customer may be a member of a composite community through membership in one of the composite community's sub-communities or through membership in the composite community. For example, in one embodiment, the "Golf Enthusiasts" composite community may include the members of the Tiger Woods Fans" community and the "Beginner Golfers" community as well as other members. In other embodiments, membership to a composite community may be confined to only those customers who are members of at least one of the sub-communities. The various communities may be arranged within a browse tree, thereby permitting customers to locate and view lists of the recommended items within specific communities. For more information on the browse trees, please refer to the section below entitled "Community Browse Trees."

The customer's community memberships may be recorded within the user profile 132 stored on the merchant web site 130. In addition, community membership information may also be recorded within a cookie on the customer computer 110 reducing the need to access the merchant web site 130 for requests for web pages that are dependent on the user profile 132. One method which may be used to store such information within cookies is described in U.S. patent application Ser. No. 09/494,712, filed Jan. 31, 2000 and entitled "USE OF BROWSER COOKIES TO STORE STRUCTURED DATA," the disclosure of which is hereby incorporated by reference.

By tracking product interest activity of customers within an associate-based community, the merchant web site 130 may generate and display lists of the recommended products, such as best selling book titles, to members of the associate-based community and possibly other customers. One method that may be used to identify best-selling or popular titles involves monitoring the "velocity" of each product (the rate at which the product moves up a bestsellers list) or the "acceleration" of each product (the rate at which the velocity is changing, or at which sales of the product are increasing over time). In addition, the merchant web site 130 may track products that have become unusually popular within their respective communities, referred to as "hotsellers." One such method that may be used to identify the hotsellers (or for generating community recommendations in general) involves applying an algorithm referred to as the censored chi-square recommendation algorithm to the purchase or other history data of users. The censored chi-square recommendation algorithm is one example of an algorithm that may be used to identify popular products or other items within a community, and is described in the attached appendix, which forms part of the disclosure of the specification.

III. Sample Web Pages

The following provides a brief description of a few sample web pages including an associate web page, a product web page, and a merchant's community web pages. It is recognized that a wide variety of web pages and/or other electronic documents may be used and that the sample web pages are meant to illustrate various embodiments of the invention.

A. Associate Web Page

Figure 2:
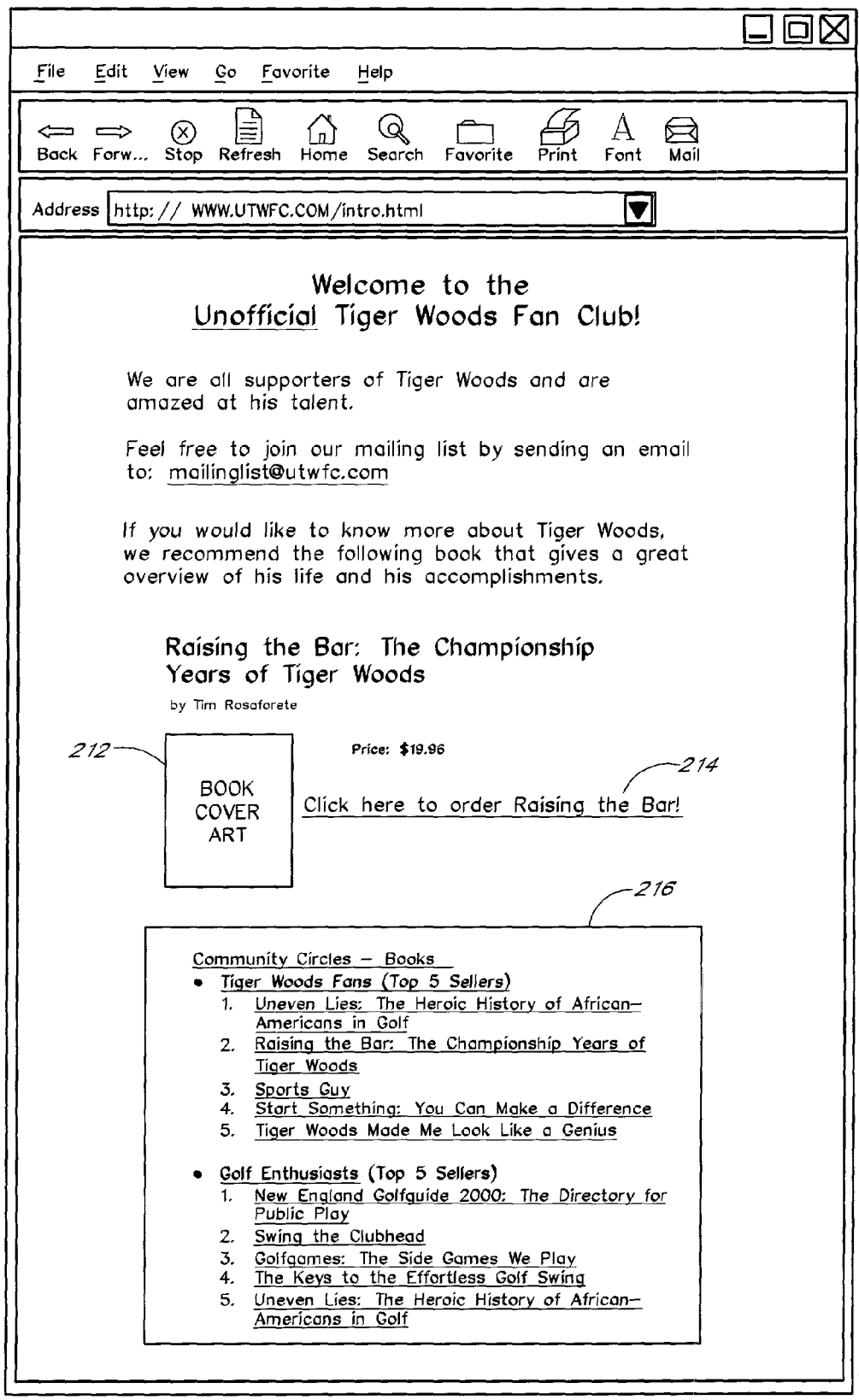
FIG. 2 illustrates one embodiment of an example web page of an associate web site.

FIG. 2 illustrates a sample web page of the "Unofficial Tiger Woods Fan Club" associates 210. The exemplary web page 210 includes general information about the associate, as well as information about a featured book about Tiger Woods titled "Raising the Bar: The Championship Years of Tiger Woods." The featured book information includes the title and author of the book as well as a brief description and recommendation of the book from the associate. In FIG. 2, the graphic icon 212 that is a scaled-down replica of a book cover. The web page 210 also includes a referral link in the form of a textual hyperlink 214 which, when selected, takes the customer to the merchant web site 130 and presents the customer with the product detail page for the Tiger Woods book. The graphic icon 212 of the book cover art also functions as a referral link enabling the customer to click on the icon 212 to access the merchant web site 130.

The associate web site 120 may include referral links to the merchant web site 130 on one or more of its web pages. Furthermore, the referral links may relate to different products and/or product groups sold by the merchant or they may relate generally to the merchant web site 130, such as a banner ad for the merchant web site 130 or a hyperlink to the merchant web site's home page.

The exemplary web page 210 also includes a listing of recommended titles 216 which are top sellers within communities related to the associate. In the exemplary listing 216, the two communities, "Tiger Woods Fans" and "Golf Enthusiasts," are related to the Unofficial Tiger Woods Fan Club associate. The community names may be listed as hyperlinks which, when selected, take the customer to the home page of the corresponding community in the merchant web site 130. In addition, the list of top sellers may be implemented as hyperlinks which, when selected, take the customer to the product detail page of the selected book in the merchant web site 130. In other embodiments, the listing 216 may only include the community names or only the book titles. Furthermore, the number of associate-based communities listed may be limited. Alternatively, the listing 216 may include referral links to the community pages in which the featured books are recommended.

The listing of recommended titles 216 is generated by the merchant web site 130 and then provided to customer computer 110 and/or the associate web site 120. It is recognized, however, that a third party may generate the listing of recommended items 216 and provide the listing 216 to the associate web site 120 without requiring the associate web site 120 to contact the merchant web site 130.

B. Product Web Page

Figure 3:
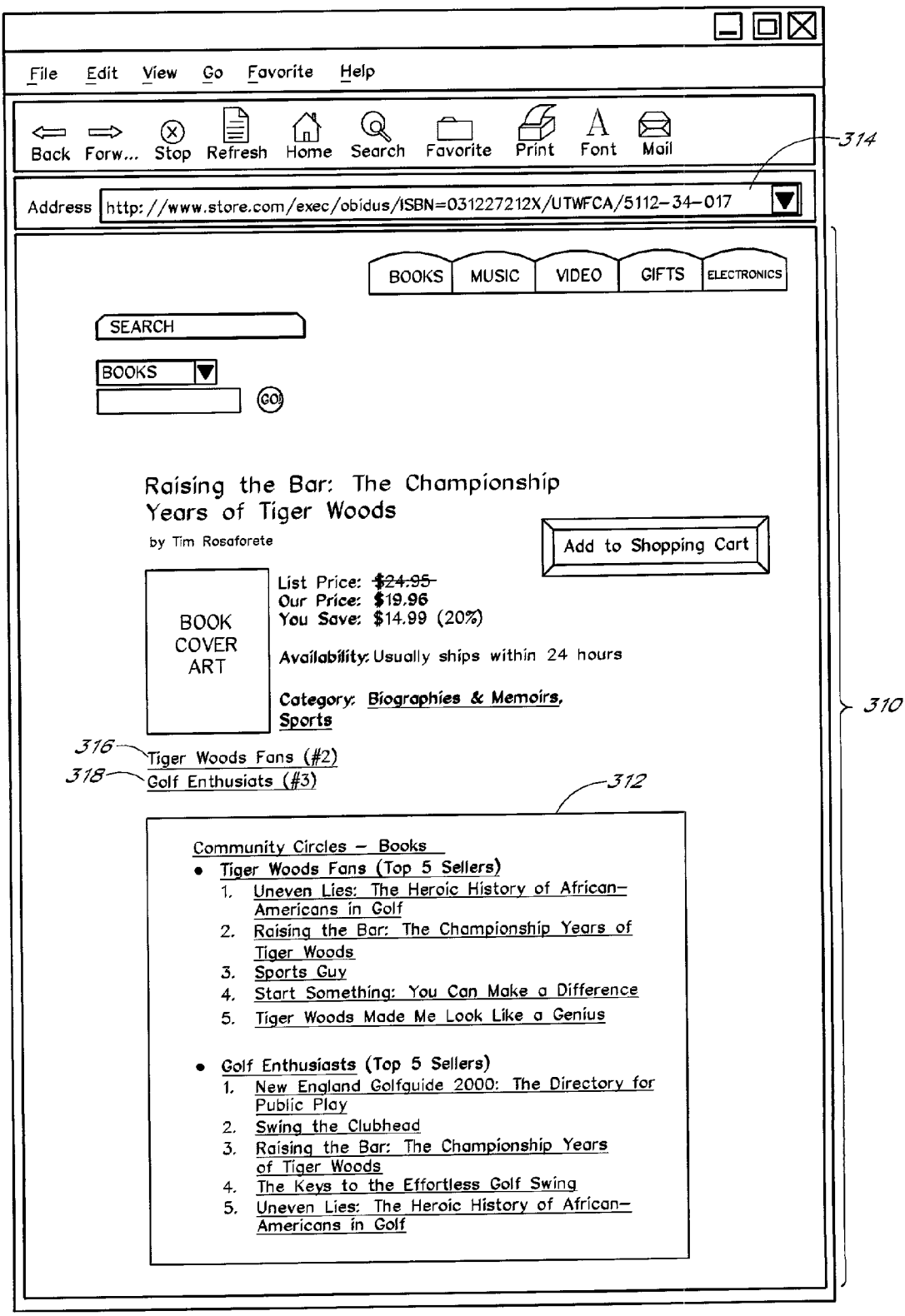
FIG. 3 illustrates one embodiment of an example web page of a merchant web site.

FIG. 3 illustrates a sample product detail page 310 of the merchant web site, as dynamically customized for a customer referred by the Unofficial Tiger Woods Fan Club associate. The product detail page 310 provides detailed information about a particular product or group of products. In one embodiment, each product detail page 310 typically includes a description, picture, price, customer review, lists of related products, and information about the product's availability. The merchant web site 130 is preferably arranged such that, in order to access the product detail page 310 of a product, a customer either selects a link associated with that product (e.g., from a browse node page or search results page) or submits a search query uniquely identifying the product. Thus, the customer's accessing of a product detail page generally represents an affirmative request by the customer for information about that product.

The exemplary product detail page 310 includes information about the book titled "Raising the Bar: The Championship Years of Tiger Woods" and enables the customer to purchase the book. The product detail page 310 also includes a list of recommended titles 312 for books that are popular within communities that relate to the referring associate. In one embodiment, the product detail page address associated with a referral link may be a URL 314 which comprises the unique customer ID (obtained from the customer's cookie or URL information) as well as a unique associate ID that identifies the referring associate. The URL may also include a product ID that corresponds to the product featured on the associate web site, if applicable. It is recognized, however, that a variety of methods may be used to track where the customer came from as long as the associate may be identified. In this example, the merchant web site 130 processes the URL 314 using the product ID to obtain the product's corresponding product detail page 310 as well as the store ID to determine the identity of the referring associate. The merchant web site 130 may then select one or more communities related to the referring associate and retrieve a listing of the recommended products 312, such as top selling or most frequently viewed products or product groups within the related communities. This listing 312 may be incorporated into the product detail page 310 as a set of selectable hypertext links that correspond to the recommended products, as discussed above. The web page 310 which includes the listing 312 is then passed to the customer computer 110 from the merchant web site 130. In FIG. 3, the web page 310 includes recommendation lists 312 for the associate-based communities "Tiger Woods Fans" and "Golf Enthusiasts."

The exemplary web page 310 also includes product hyperlinks 316, 318 signifying that the featured product is included in the corresponding community's recommendation list.

The web page 310 may also include other information from other communities such as, for example, communities that the customer explicitly joined as well as communities to which the customer is implicitly affiliated (e.g., regional/geographic-based communities, age-based communities, and so forth).

C. Community Web Pages

Figure 4:
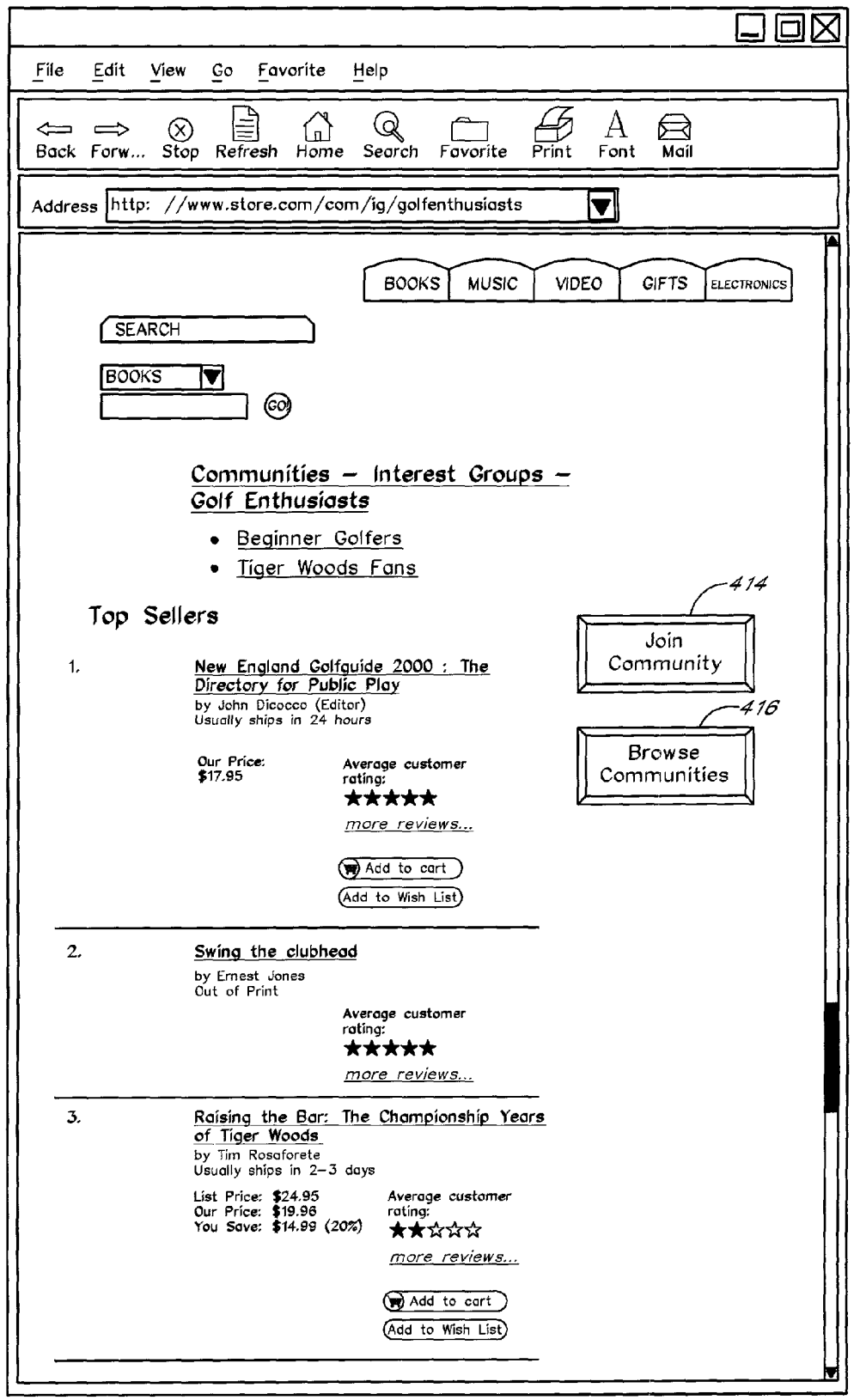
FIG. 4 illustrates one embodiment of an example web page of the merchant web site of a community's top selling books.

FIG. 4 illustrates a sample web page 410 for the community "Golf Enthusiasts," as hosted by the merchant web site 130. The exemplary web page 410 illustrates the Golf Enthusiasts' community's top seller list 412. The web page 410 may be accessed, for example, by selecting a referral link from the associate web site 120, by selecting a link from a product detail page 310, or from a link on the Interest Group web page 410 as discussed below. The sample web page 410 includes a list of the top selling books 412 among members of the community and includes interface components that enable a customer to purchase the one or more of the listed products. In addition, the web page 410 enables the customer to join the current community by selecting the "Join Community" button 414. It is recognized that in other embodiments, the customer may automatically join the community by performing an activity, such as browsing a community or making a purchase. The customer may also select the "Browse Communities" button 416 to view other communities and their corresponding lists of recommended products.

Figure 5A:
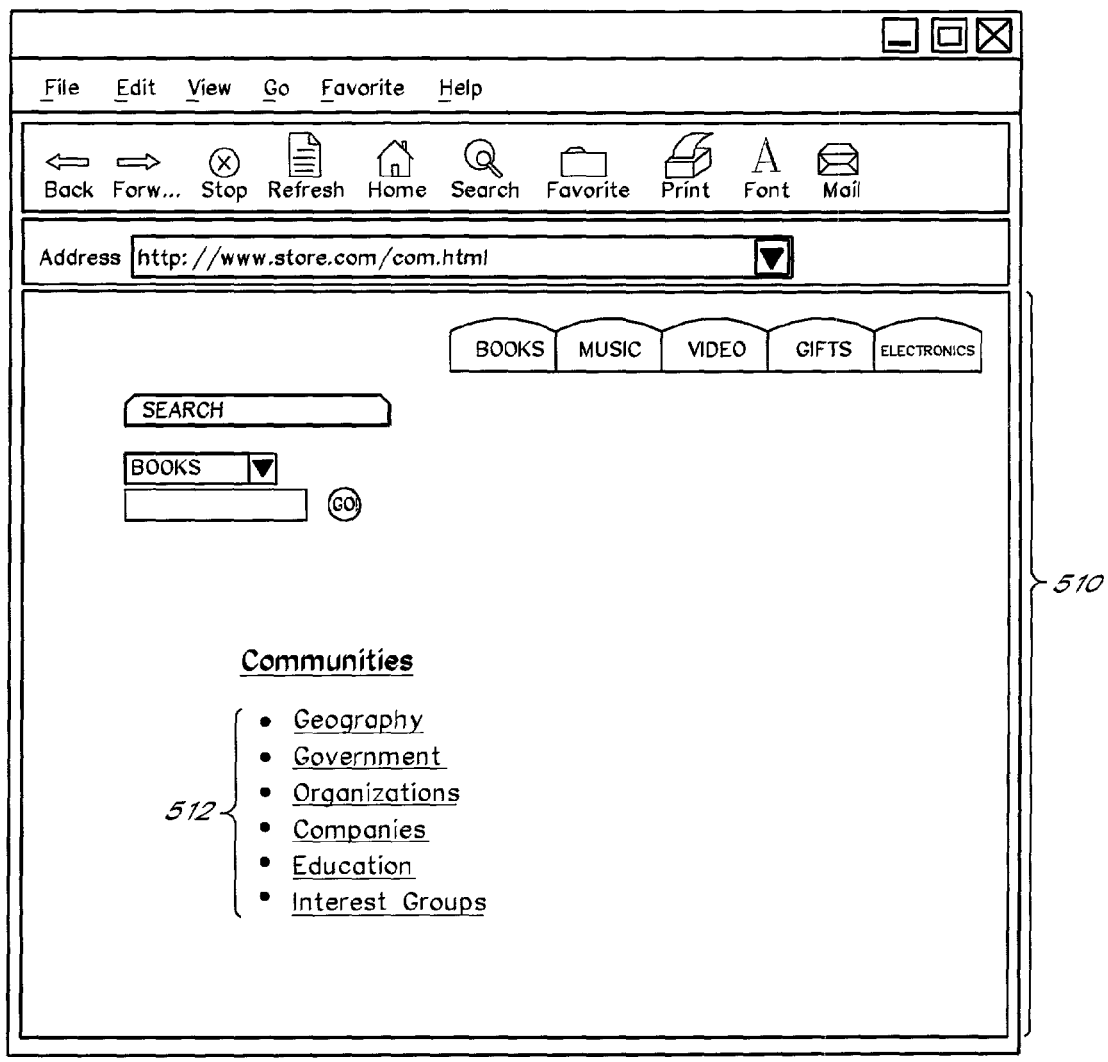
FIG. 5A illustrates one embodiment of an example web page listing community groups in a merchant web site.
Figure 5B:
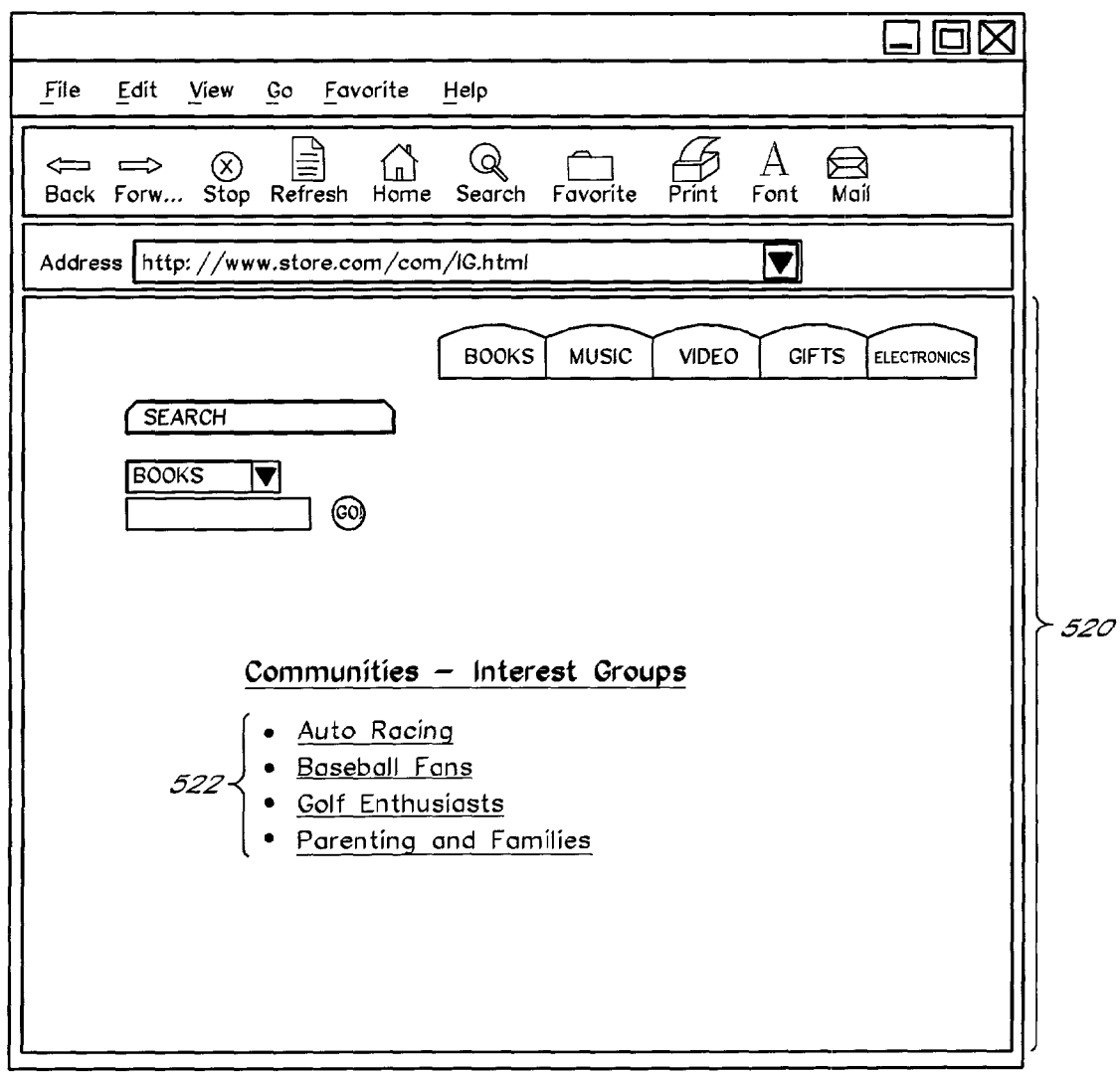
FIG. 5B illustrates one embodiment of an example web page listing interest-based community groups of a merchant web site.

FIGS. 5A and 5B illustrate web pages that enable a customer to access and/or browse the communities. In FIG. 5A, the web page 510 includes a hyperlink listing of the communities 520. The customer may select "Interest Groups" to view communities that have been formed on the basis of related interests as illustrated in FIG. 5B. The web page 520 illustrated in FIG. 5B includes a hyperlink list of the various Interest Groups 522, namely, Auto Racing, Baseball Fans, Beginner Golfers, Golf Enthusiasts, and Parenting and Families. The customer may select the "Golf Enthusiasts" link to access the web page shown in FIG. 4.

The interest-based communities may be accessed via the web pages 510, 520, illustrated in FIGS. 5A and 5B. In addition, the interest-based communities may be accessed via a hyperlink on a product detail page 310. For example, FIG. 3 illustrates a sample product hyperlink shown as "Golf Enthusiasts (#3)" 318 signifying that the featured product is the third item on the Golf Enthusiast's recommendation list. By selecting the hyperlink, the user is presented with the Golf Enthusiasts community page 410 such as that illustrated in FIG. 4. In some embodiments, a similar hyperlink may be included as part of the web detail page of the products that appear in the interest-based purchase circles page. Using FIG. 4 as an example, the product detail pages for "New England Golf Guide," "Swing the Clubhead," "Golf Games," and so forth may include the hyperlink "Golf Enthusiasts" with a number indicating the products' positions in the list. While FIG. 3 illustrates a product detail page 310 accessed via a referral link, it is recognized that product detail pages accessed from within the merchant web site 130 may also include product hyperlinks.

The interest-based communities may also be accessed via product detail pages that relate to an interest-based community. For example, a product detail page, which corresponds to a product referred to by an associate, may include links to or recommendations from interest-based communities to which the associate is related. For example, FIG. 3 illustrates a product detail page 310 for the book "Raising the Bar." The web page includes hyperlinks to the interest-based communities "Tiger Woods Fans" and "Golf Enthusiasts."

D. Community Browse Trees

Figure 6A:
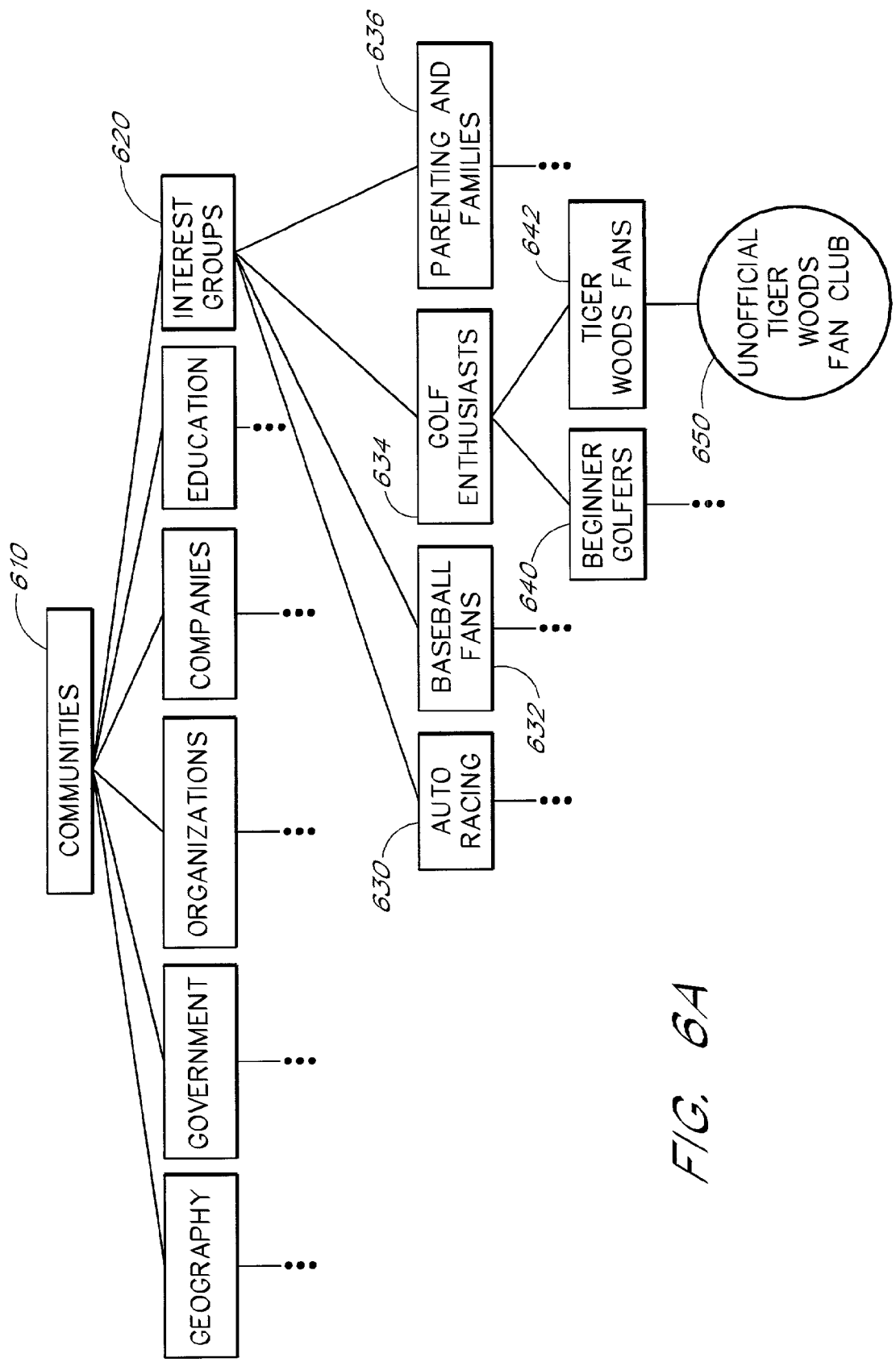
FIG. 6A illustrates one embodiment of a hierarchy of community groups.
Figure 6B:
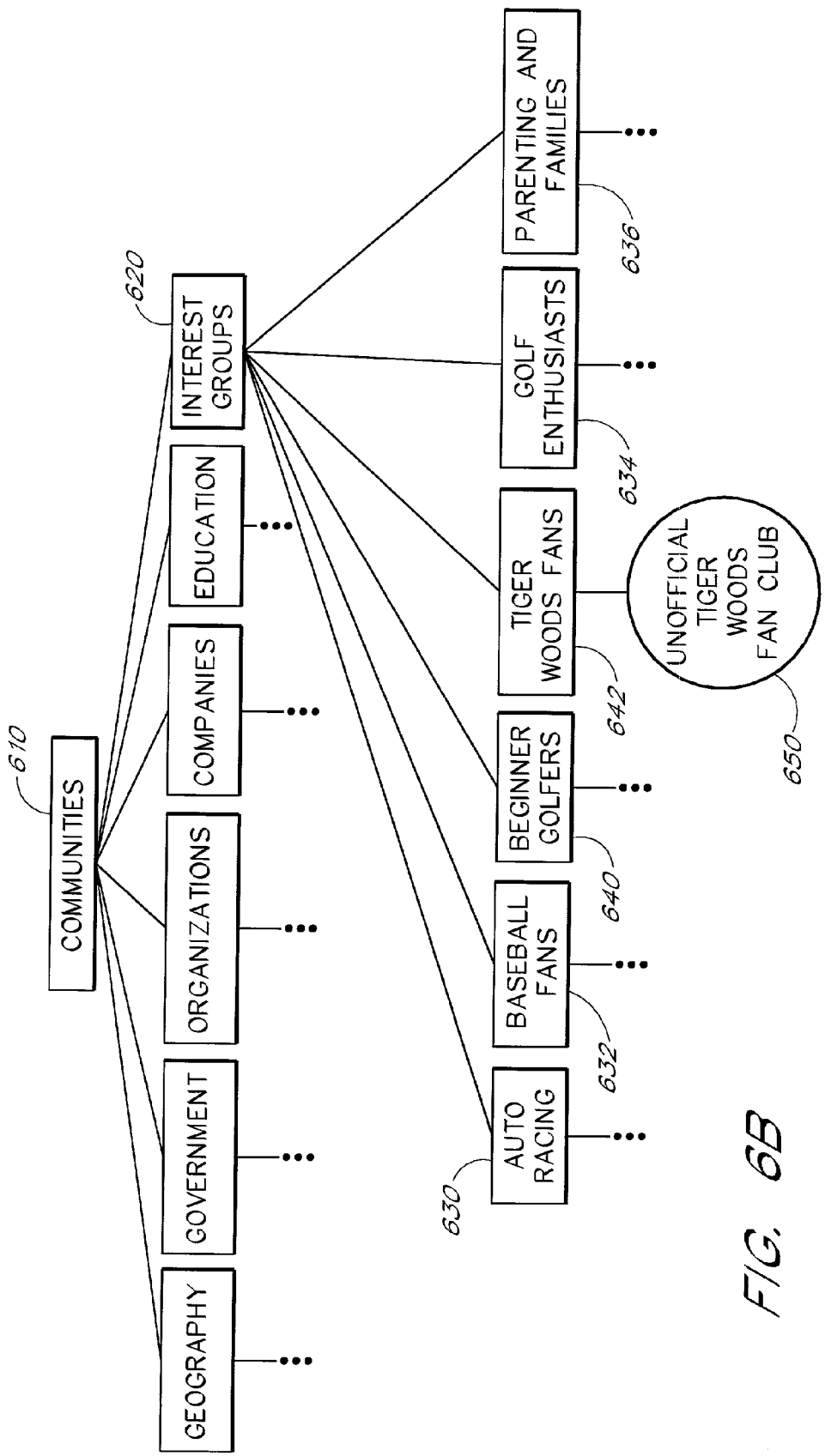
FIG. 6B illustrates an additional embodiment of a hierarchy of community groups.

FIGS. 6A and 6B illustrate browse trees that show how the sample communities may be organized and how a customer may access and/or browse the communities. FIG. 6A illustrates one embodiment of a hierarchy of communities 610 wherein the communities include interest-based groups ("Interest Groups") 620. In one embodiment, the interest groups 620 include associate-based communities, though it is recognized that in some embodiments the interest groups 620 may include other communities which are formed on the basis of related interests in addition to or without using associate referral data.

The exemplary Interest Groups 620 are organized by topic and include the following communities: Auto Racing 630, Baseball Fans 632, Golf Enthusiasts 634, and Parenting and Families 636. In addition, the Golf Enthusiasts 634 community is a composite community that includes the communities Beginner Golfers 640 and Tiger Woods Fans 642. The "Unofficial Tiger Woods Fan Club" associate 650 is illustrated as being associated with the Tiger Woods Fans community 640 as well as the Golf Enthusiasts community 642 (due to the fact that the Tiger Woods Fans community 640 is a sub-community of the Golf Enthusiasts community 634).

FIG. 6A is meant to illustrate one set of communities 610 that may be used to implement the web pages 510, 520 shown in FIG. 5A and FIG. 5B. It is recognized that, in other embodiments, a variety of interest groups, communities, and associates may be used. For example, FIG. 6B illustrates another embodiment of a hierarchy of communities 610 wherein the communities Beginner Golfers 642 and Tiger Woods Fans 640 are not sub-communities of the Golf Enthusiasts community, and thus the "Unofficial Tiger Woods Fan Club" associate 650 is associated with the Tiger Woods Fans community 640, but not automatically with the Golf Enthusiasts community 634.

It is recognized that a variety of interest groups 620 may be used and that additional interest groups 620 may be added and that categories of interest groups 620 may be formed (e.g., Sports, Family, etc.). Further, the interest groups 620 may include associate-based communities and/or other communities that have been formed on the basis of a common interest.

The interest groups shown in FIGS. 5B, 6A, and 6B are meant to illustrate embodiments of the invention and not to limit the scope of the invention.

IV. System Architecture

Figure 7:
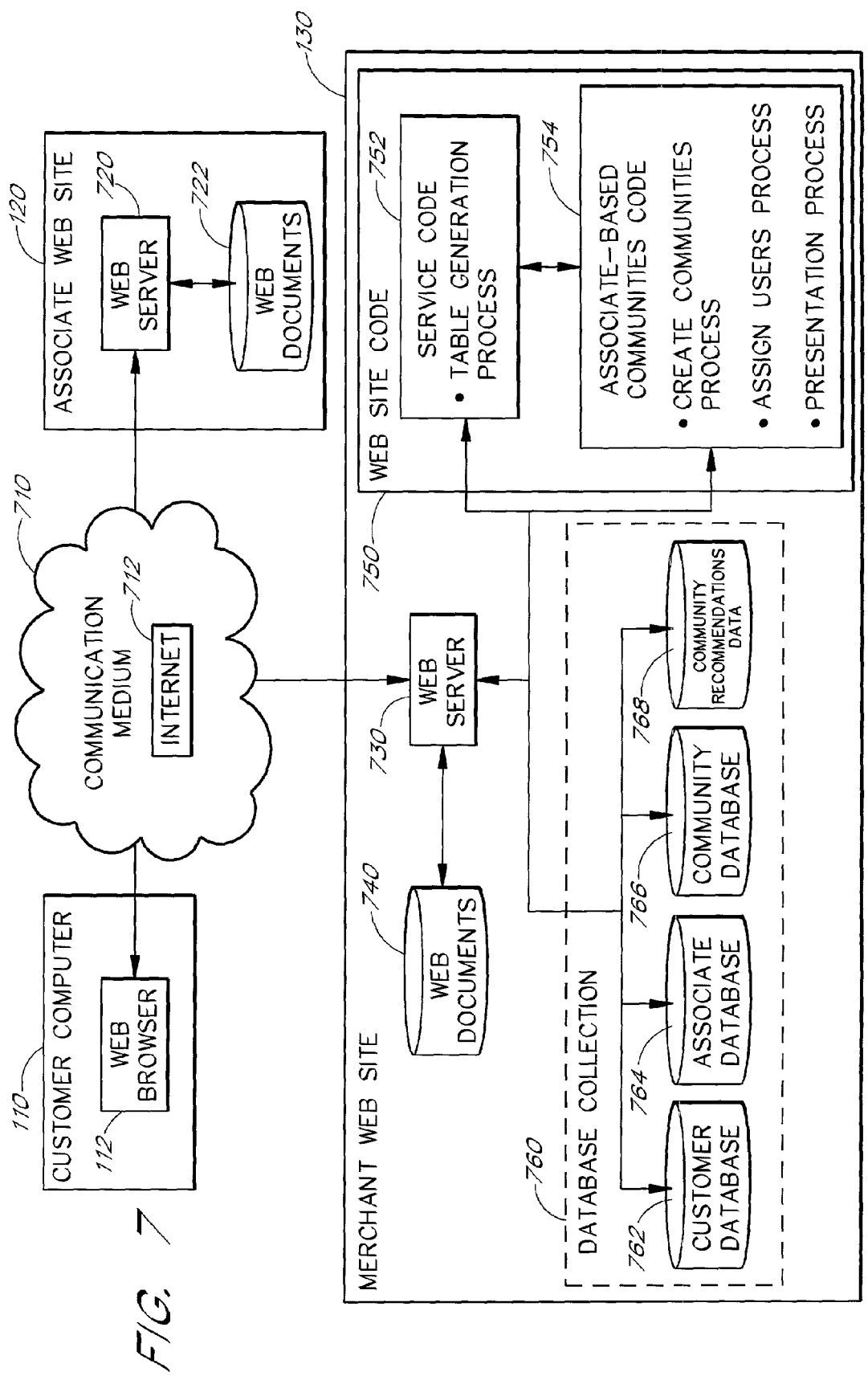
FIG. 7 illustrates a general architecture of one embodiment of an associate-based communities system.

FIG. 7 illustrates one embodiment of a general architecture of an associate-based community system that operates in accordance with the present invention. The system includes a customer computer 110, an associate web site 120, and a merchant web site 130 that communicate via a communication medium 710, such as the Internet 712.

A. Customer Computer

The customer computer 310 may be implemented using any type of computing device that enables a customer to interactively browse a remote web site or online catalog through the communication medium 330 using, for example, a web browser 112, such as, the Netscape® Navigator developed by Netscape, Inc. or the Microsoft® Internet Explorer developed by Microsoft Corp. For example, the customer computer 310 may be, for example, an interactive television, a cellular phone, a personal digital assistant, an interactive wireless communications device, a telephone that connects with an Automated Voice Recognition ("AVR") system, a handheld computer, or the like, which interacts with the communication medium.

B. Associate Web Site

The associate web site 120 is a separate web site from the merchant web site 130 that provides one or more links to the merchant's web site 130. Typically, the associate web site 120 is owned and operated by an individual or business entity ("associate") that is not in the same business as that of the merchant. For example, the associate may be an individual that is in the business of rating mystery novels or providing golf lessons. In one embodiment, the associate has registered with the merchant using, for example, an online registration process (not shown). Typically, the associate and the merchant have an agreement under which the associate receives commissions or bounty payment for customer referrals. The associate web site 120 may identify customers using any appropriate method, such as cookie retrieval or log-in procedures.

In one embodiment, the associate web site 120 includes a web server 720 used to communicate with the customer's web browser 112 and a database of web documents 722 to be sent to the user. The web documents 722 may include standard HTML documents as well as other types of documents. The web server 720 may process requests for the documents 722, review the documents 722, and send the documents 722 to the requesting computer via the communication medium 710.

The web documents 722 may include special hyperlinks ("referral links") that enable customers to access the merchant web site 130. Typically, one referral link is provided for each product displayed on the associate's web site 120. Alternatively, a referral link may be provided for a group of products ("product group") or to some of the merchant's general web pages (e.g., home page, search page, community pages, etc.). When a customer selects a referral link associated with a particular product or product group, the customer is automatically connected to the merchant web site 130 and is presented with various options for purchasing the selected product from the merchant. The referral link thus serves as a referral mechanism for referring the customer to the merchant web site 130 from an associate web site 120.

In one embodiment, the referral links are provided in association with additional information that is transmitted to the merchant web site 130 in response to the selection of the link. For example, the additional information may be embedded in a pre-defined format within the associated URL and include a unique identifier for the associate (assigned upon enrollment) and a unique identifier for the selected product (such as the ISBN of a book). The merchant web site 130 uses this information to identify the associate that is the source of the referral and to credit the referral to the associate, such as, if the customer subsequently performs specific activity (e.g., purchasing the product, placing the product in his online shopping cart, or browsing through a group of products). Commission payments may then be automatically paid to the associates on a periodic basis, such as, for example, once a month, bi-weekly, daily, and so forth.

C. Merchant Web Site

The merchant web site 130 is a web site that provides various functionality for enabling customers to purchase products including products selected from the associate web sites 120. Typically, the merchant web site 130 is operated by a business entity ("merchant") that handles the various order processing, shipping, collections, and customer service tasks associated with the sale of goods. The merchant web site 130 may include enrollment software (not shown) that implements an online registration process (not shown) for enabling other entities, such as individuals, companies, and so forth, to register as associates. The merchant web site 130 may identify customers using any appropriate method, such as cookie retrieval or log-in procedures.

As is common in the field of electronic commerce, the merchant web site 130 may include functionality that enables customers to search, browse, and make purchases from an online catalog of items or "products," such as book titles, music titles, video titles, DVDs, toys, and electronics products. The various product offerings may be arranged within a browse tree in which each node represents a category/group or subcategory/subgroup of products. Browse nodes at the same level of the tree need not be mutually exclusive.

The merchant web site 130 may also include a shopping cart feature (not shown), wherein customers may add and remove items to and from a personal shopping cart which is persistent over multiple sessions. (As used herein, a "shopping cart" is a data structure and associated code which keeps track of items that have been selected by a customer for possible purchase.) For example, a customer may modify the contents of the shopping cart over a period of time, such as one week, and then proceed to a check out area of the site to purchase the shopping cart contents.

The sample merchant web site 130 illustrated in FIG. 7 includes components that may be used to implement the above-described features. The exemplary merchant web site 130 includes a web server 730 which accesses a database of web documents 732 and related content. The web documents 732 may include standard HTML documents as well as other types of documents. The web server 730 may process requests for the documents 40, review the documents 740, and send the documents 740 to the requesting computer via the communication medium 710. The documents 740 may be used to generate the merchant web pages, such as those illustrated in FIGS. 3, 4, 5A, and 5B.

The web server 730 communicates with web site code 750 as well as a database collection 760 to create associate-based communities that are based upon the customer's interaction with associate web sites 120, to manage the associate-based communities, and to provide customers with recommendations. The web site code 750 may include service code 752, as described in detail in U.S. patent application Ser. No. 09/377, 322, filed Aug. 19, 1999 and entitled "USE OF CONTACT INFORMATION OT ASSIST USERS IN EVALUATING ITEMS," which is hereby incorporated by reference. The web site code 750 may also include associated-based communities code 754 discussed in detail below. The merchant web site 130 also includes a database collection 760 which includes a customer database 762, an associate database 764, a community database 766, community recommendations data 768, and a products database of product data (not shown).

1. Web Site Code

The web site code 750 illustrated in FIG. 7 includes service code 752 and associate-based communities code 754.

a. Service Code

The service code 752 may include one or more processes for generating tables of community recommendations including best selling lists, recommended products, unique products, and so forth for the various communities such as the table 136 illustrated in FIG. 1. The table generation process may be implemented as an off-line process that periodically (e.g., daily, weekly, bi-weekly, etc.) generates the tables based on information stored in the customer database and the community database. The service code 752 analyzes product interest activity, such as purchase histories, product viewing histories, and other browsing histories, to identify recommended items. The service code 752 may also include a process for generating community best seller web pages such as that illustrated in FIG. 4. Examples of algorithms that may be used to perform such analysis as well as more details on the service code are described in U.S. patent application Ser. No. 09/377,322 referenced above. For a detailed description of one embodiment of a table generation process, please refer to the section below entitled "Service Code Process—Table Generation Process."

b. Associate-Based Communities Code

The web site code 750 may also include associate-based community code 754 as illustrated in FIG. 7. The associate-based community code 754 includes a process for creating associate-based communities, a process for assigning customers to associate-based communities, and a process for presenting associate-based community recommendations to customers. For a detailed description of the associate-based community code 754 processes, please refer to the section below entitled "Associate-Based Community Code Processes."

2. Database Collection

The database collection 760 illustrated in FIG. 6 includes a customer database 762, an associate database 764, a community database 766, and community recommendations data 768.

a. Customer Database

The customer database 762 or user database stores information about existing customers of the merchant web site 130. This information, sometimes referred to as the customer's "user profile," may include the name, shipping address, e-mail address, and payment information of the customer. The information may also include associates that have referred the customer to the merchant web site 130, the customer's related communities (e.g., communities that the customer is a member), the customer's presentation preferences, as well as service preference data, that is whether the customer has elected to participate in various services. The customer database 762 may also store information about the customer's activity or interactions with the merchant web site 130, such as product interest activity (e.g., purchase history data, shopping cart history data, click through data, etc.). One embodiment of a user profile 132 is illustrated in FIG. 1.

b. Associate Database

The associate database 764 stores information about the associates enabling the merchant web site 130 to properly track and credit associate referrals. This information may include the unique ID assigned to the associate and enrollment information pertaining to the associate, such as, for example, associate name, contact person data, payee data, name of web site, home page URL of web site, intended product listings, payment information, and so forth.

c. Community Database

The community database 766 includes information about the communities of the merchant web site 130. This information may include, for example, community name, type of the community (e.g., college/university, local community group, etc.), location of the community (e.g., city, state, country, etc.), whether the community is private, authentication information required to join the community, as well as any community policies (e.g., by joining, all users agree to expose their purchases to other members). For implicit membership communities, the community database 766 may also include information about the conditions which give rise to membership. As indicated above, the information stored within the community database 766 may be generated by end users, system administrators, or both.

The community database 766 may also include information about any composite communities that have been defined. As previously discussed, the communities may include composite communities which are communities formed as the collection of two or more other communities ("sub-communities"). For example, the communities "Tiger Woods Fans" and "Beginner Golfers" may be combined to form a composite community of "Golf Enthusiasts." Moreover, "Tiger Woods Fans" and "Nick Faldo Fans" may be combined to form a composite community of "Golf Legends," and "Golf Legends" and "Beginner Golfers" may be combined to form a composite community of "Golf Enthusiasts." For each composite community, the community database 766 may store information such as the community name and a list of the community's sub-communities, as well as any individual associates that are members of the composite community. The community database 766 may also include information about relationships or associations among communities.

In other embodiments, the community database 766 may also store information about the associate-community relationships as well as the user-community relationships. One embodiment of a set of community definitions 134, which may be stored in the community database 766, is illustrated in FIG. 1.

d. Community Recommendations Data

The community recommendations data 768 tracks information relating to the recommendations for the communities. The recommendations may include bestseller lists, most frequently browsed lists, unique items lists, and so forth. For example, in one embodiment, each record in the community recommendations data for a best seller list may include: (a) the product's ID and (b) a count value which represents, for a given time window, the number of copies purchased by members of the community. It is recognized that the product IDs may be assigned and/or processed such that different media formats (e.g., paperback, hardcover, and audio) of the same title are treated as the same item.

In some embodiments, the community recommendations data 768 may be stored only for non-composite communities such that the merchant web site 130 may combine the lists of the non-composite communities to form a composite list for a composite community. In other embodiments, community recommendations data 768 may be stored for each community. One embodiment of a set of community recommendations data 136 is illustrated in FIG. 1.

e. Products Database

As mentioned above, the database collection 760 may also include a products database of product information. Thus, information such as the product's name, code, price, medium, author, publisher, and so forth may be stored.

f. Alternative Implementations

In connection with the database collection 760, in one embodiment, there may be several processes (not shown) such as ID generators, number generators, statistic generators, session generators, and temporary storage units that work with the database collection 760. Furthermore it is recognized that the database collection 760 may be implemented using a variety of different databases such as relational databases, flat file databases, or object-oriented databases. Moreover, while the database collection 760 depicted in FIG. 7 is comprised of several separate databases, it is recognized that in other embodiments, the database collection 760 may include other databases or two or more of the databases may be combined. In addition, the database collection 760 may be implemented as a single database with separate tables or as other data structures that are well know in the art such as linked lists, stacks, binary trees, and so forth.

D. Communications Medium

The presently preferred communication medium 710 includes the Internet 712, though a wide range of interactive communication mediums may be employed in the present invention as is well known to those skilled in the art.

E. Other Embodiments

While FIG. 7 illustrates an embodiment wherein the merchant web site 130 provides the associate-based communities service, it is recognized that in other embodiments, the merchant web site 130 may work in conjunction with one or more third parties (not shown) to provide associated-based community recommendations. For example, the merchant web site 130 may provide a third party web site with customer profile information such as, referring associates, browsing histories, and associate-based community definitions. Note that in some embodiments, the third party may or may not receive customer identifiers. The third party web site may then create the community-specific recommendation lists. In some embodiments, the third party web site may receive requests for recommendations and/or send the recommendations to the requesting computer.

Furthermore, although the embodiments described herein use web site technology to disseminate documents, a variety of document types and electronic dissemination technologies may be used. For example, the associate's HTML documents may be in the form of hypertextual e-mail messages that are disseminated by a list server or PUSH documents disseminated by a PUSH server. As interactive television, video-on-demand, and Web TV technologies continue to evolve, it is contemplated that the "web documents" may include video advertisements that are displayed to the customer on a television screen. Further, although hypertextual documents are preferably used, it is possible for an associate to use non-hypertextual catalogs (including paper-based product catalogs) that simply instruct the customer to manually enter the appropriate URL (including the referral information) into a browser program.

In addition, although the associate-based communities system is described using "an" associate web site 120, is recognized that a given associate may disseminate its web documents (using the single associate ID assigned during online registration) from multiple different sites, including sites that use different document formats and transfer protocols. In addition, an associate may provide referrals to more than one merchant. Further, although the system is described herein in the context of a merchant that sells products, it is recognized that the architecture may also be used to sell services including online services that are provided over the Internet.

V. Processes

As noted above, the associate-based communities system may include service code processes and associate-based communities code processes. As used herein, the term "process" refers to a computer memory having executable code stored therein which, when executed by a computer processor, performs one or more operations.

A. Service Code Process—Table Generation Process

Figure 8:
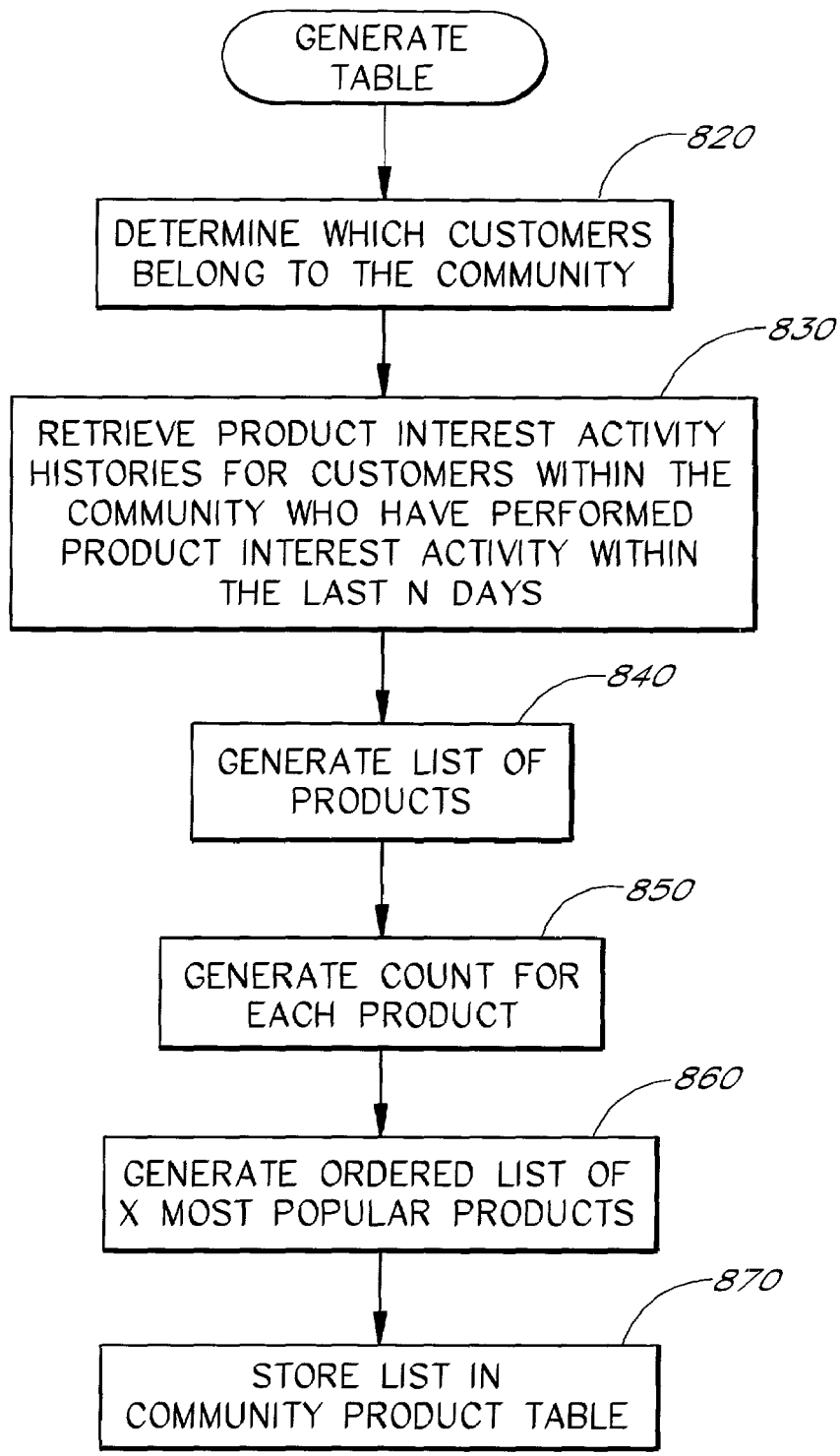
FIG. 8 illustrates a flow diagram one embodiment of a table generation process.

FIG. 8 illustrates one embodiment of a community recommendations table generation process ("table generation process") used to generate community recommendations data 768 such as the set of data 136 shown in FIG. 1. The merchant web site 130 may execute the table generation process off-line on a periodic basis, such as daily or weekly. It is recognized, however, that other entities, such as outside third parties may also execute the table generation process and that the process may be executed at a variety of times. Furthermore, the table generation process may be implemented to update the community recommendations data 768 in real-time in response to customer activity.

The table generation process determines which customers belong to the community (block 820). This information may be stored in the community database 766 or generated on real-time (e.g., querying the customer database). Next, the table generation process retrieves the product interest activity histories for customers within the community who have performed product interests activity within a predetermined period of time N (e.g., 2 hours, 4 days, 30 days, etc.). The variable N specifies the time window to be used for generating the community recommendations data 768 and may be selected according to the desired goals of the service. Different time windows may alternatively be used for generating different types of lists (e.g., best seller lists, most popular lists, hotselling items lists), and different time windows may be applied to different types of communities. As discussed above, product interest activity may include a wide variety of customer activity, such as, for example, purchases, viewing of product detail pages, searching, submission of ratings or reviews, placing a bid, adding products to an online shopping cart, and so forth.

Proceeding to the next state, the table generation process generates a list of products for which there was some product interest activity within the last time period N (block 840). Next, the table generation process generates a count for each product (block 850). The product's count may be stored in a data structure such as a temporary array ("product count array") wherein each entry in the array includes a product count value indicating, for the community/product pair, the number of times product interest activity was performed by customers within the time period N. A pseudocode listing of a routine that may be used to generate the product count array is shown in Table 1. Multiple instances of activity for the same product by the same customer may be counted as a singe activity or may be counted as multiple instances of activity when generating the array.

TABLE 1

For each customer;
    For each product incurring some product interest activity by customer in last period of time N;
        increment count(community, product)

Proceeding to the next state, the data stored in the product count array is used to generate the community recommendations lists (block 860). For example, the table generation process may form a list of the products, sort the list according to counts, and then truncate the list to retain only the X most highly recommended titles, thereby creating a list where X is an integer (e.g., 100). It is recognized that product velocity and/or acceleration may also be incorporated into the process. The velocity and acceleration values may be calculated by comparing count-ordered lists generated from the temporary table to like lists generated over prior time windows. For example, a product's velocity and acceleration may be computed by comparing the product's position within a current purchase-count-ordered list to the position within like lists generated over the last 3 days. The velocity and acceleration values may be used, along with other criteria such as the purchase counts, to score and select the products to be included in the lists.

As mentioned above, the censored chi-square recommendation algorithm described in the attached appendix may be used to identify the most popular products in the community. When such an algorithm is used, the products identified in block 860 are those whose popularity levels are significantly higher in the community than in the general user population.

Proceeding to the next state, the table generation process stores the lists in a community recommendations table (block 870), such as the one illustrated in FIG. 1. In one embodiment, the new table replaces any existing table. Furthermore, the popularity lists of communities that have less than a pre-specified threshold of product interest activity (e.g., less than 5) may optionally be omitted from the community recommendations table.

The table generation process may be used to update and/or create the community recommendations table for one or more communities at a time. Furthermore, the community recommendations table may be generated based upon one type of product interest activity, such as the viewing of product detail pages, or upon multiple types of product interest activity wherein the count value represents a collective value of the product interest activity performed. In addition, more than one count value may be stored in the array. For example, the array values, for each community/product pair may include:

(product, total count, purchase activity 1 count, . . . , purchase activity X count)

where X is an integer.

It is recognized that in other embodiments, the table generation process may generate recommendation lists for composite communities by combining the recommendation lists of the sub-communities that belong to the composite communities. Furthermore, generation of the recommendation lists for the composite communities may be included as part of the table generation process or it generated by combining the lists in real time.

B. Associate-Based Communities Code Processes

As noted above, the associate-based community code 754 includes a process for creating associate-based communities, a process for assigning customers to associate-based communities, and a process for presenting associate-based community recommendations to customers.

1. Create Communities Process

Figure 9:
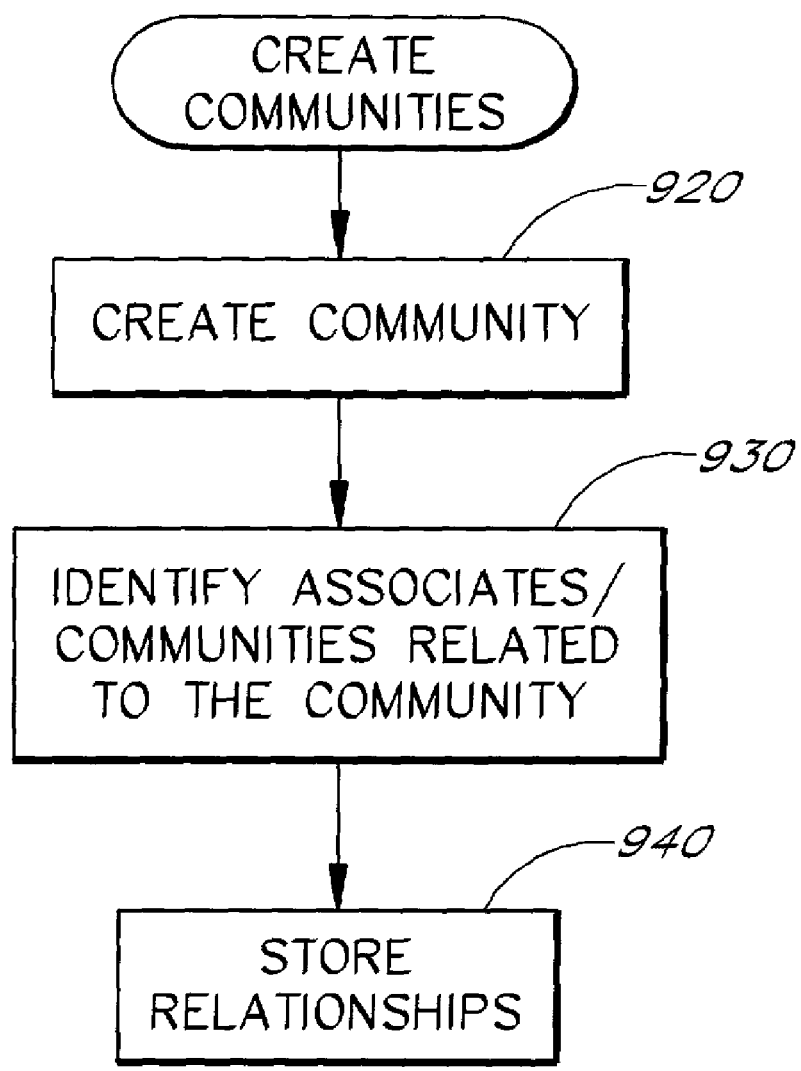
FIG. 9 illustrates a flow diagram of one embodiment of a create communities process.

One embodiment of a process for creating associate-based communities ("create communities process") is illustrated in FIG. 9. In one embodiment, the merchant web site 130 executes the create communities process off-line as necessary. It is recognized, however, that the create communities process may be run in real-time and may be executed on a periodic basis, such as, for example, hourly, daily, weekly, and so forth.

The create communities process creates a new community (block 920). In this block, the create communities process may receive user specified information about the community such as, for example, the name of the community, the type of community, the maximum/minimum number of customers for the community, as well as any other information that may relate to the community. Proceeding to the next state (block 930), the create communities process identifies associates or other communities (e.g., sub-communities) that are related to or make up the new community. This identification may be done automatically (e.g., using key words and/or customer database conditions which give rise to membership) and/or manually using explicit user-designations as to which associates belong to the community. In one example, the user may designate that the "Tiger Woods Fan Club" associate, the "PGA" associate, and the "Women's Golf Club Association" associate all relate to the "Golf Enthusiasts" community. In addition, other communities may also be designated as related to the community. For example, the "Golf Enthusiasts" community may be a composite community that is comprised of associates as well as other existing communities.

After the associates and communities related to the new community have been identified, the create community process proceeds to the next state (block 940) and stores the relationships, such as, for example, in the community database 766. It is recognized that in other embodiments, the create communities process may store the relationships in the associate database 764, in the customer database 762, and/or in other databases (not shown).

While FIG. 9 illustrates one embodiment of a create communities process, it is recognized that other implementations may be used.

2. Assign Customers Process

The associate-based community code 754 may also include a process for assigning customers to associate-based communities ("assign customers process"). In one embodiment, the merchant web site 130 may execute the assign customers process offline on a periodic basis, such as daily or weekly, and search customer records to determine which customers should be assigned to the various communities.

Figure 10:
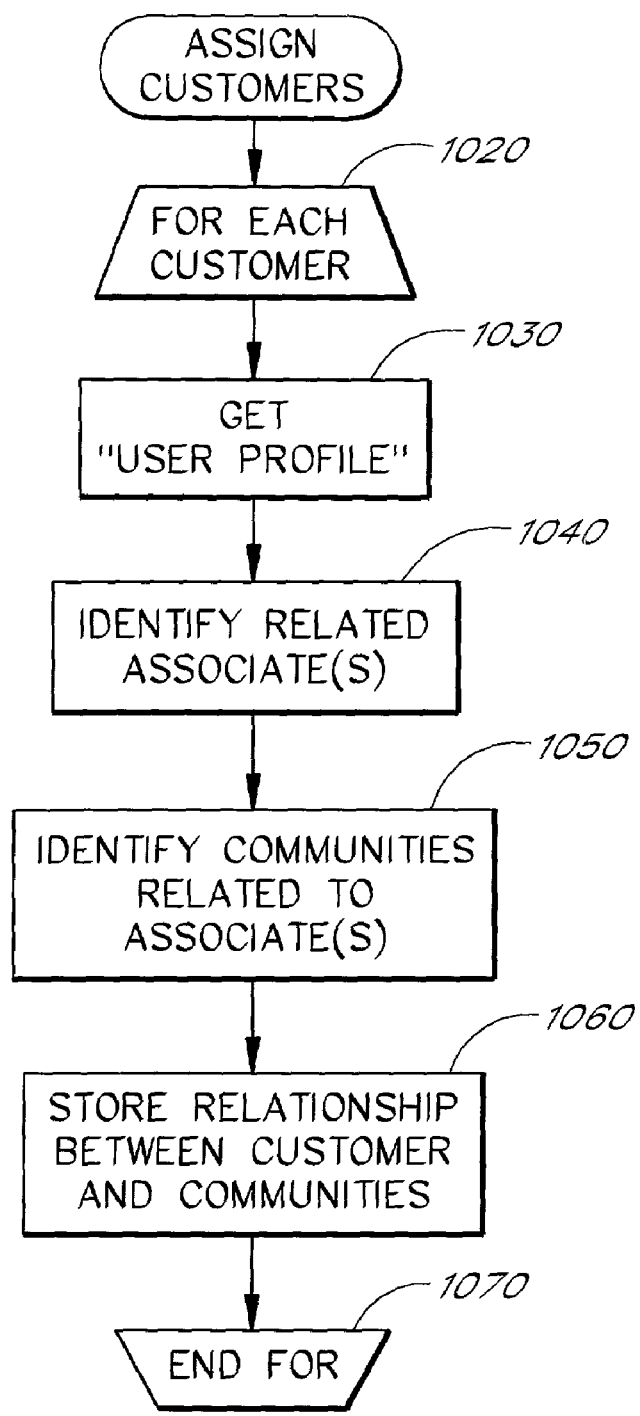
FIG. 10 illustrates a flow diagram of one embodiment of a customer assignment process.

One embodiment of an assign customers process is illustrated in FIG. 10. For each customer (block 1020), the assign customers process retrieves a user profile 132 from the customer database 762 (block 1030). It is recognized that in other embodiments, the user profile 132 may be stored in other locations. Proceeding to the next state, the assign customers process identifies the associates that are related to the customer (block 1040). In one embodiment, an associate and a customer are related if the customer has selected a referral link on the associate's web site 120. The associates related to a customer may be stored explicitly in the user profile such as, for example, as a list of related associates, as a record of related associates, and so forth. In other embodiments, however, the user profile 132 and/or the customer database 762 may store activity information about the customer which may include, for example, a list of associate web sites visited by the customer, referral links selected by the customer, and so forth. Thus, in some embodiments, the assign customers process may process the activity information to identify related associates, such as, for example, extracting the associate ID from the referral link and determining which associate corresponds to the associate ID.

A customer may be assigned to each associate to which he is related, or the customer may be assigned to a subset of the associates to which he is related. In one embodiment, the associates may be ranked in order based upon criteria such as alphabetical listing of associate names, associates referral activity, and so forth such that a subset of associates may be selected, if desired.

Proceeding to the next state, the assign customers process identifies communities related to the various associates (block 1050). In one embodiment, the assign customers process searches for the associate in the community database 766 and/or the associate database 764 to determine the communities to which the associate is related. A customer may be assigned to one or more of the communities to which the customer's associates are related. After the communities have been identified, the assign customers process proceeds to the next state and stores the relationships between the customer and the communities (block 1060). The relationship may be stored, for example, in the customer database 762, in the community database 766, or in another database. After the relationships have been stored, the assign customers process proceeds to the next state (block 1070) and retrieves another user profile if there are additional customers (blocks 1020, 1030).

While FIG. 10 illustrates one embodiment of an assign customers process, it is recognized that other embodiments may be used. For example, the assign customers process may run on a subset of customers such as those customers who have made purchases within the last year, those customers who have visited associate web sites within a designated time period, and so forth. In addition, the customers may be related to communities in real-time. For example, as a customer visits a merchant web site from an associate web site 120, the customer may be automatically added to the community or automatically asked if he wishes to be added to the community. In such cases, the assign customers process may be altered such that it is performed in real time. It is also recognized that customers that are not related to an associate may be designated as a member of the community.

3. Presentation Process

The associate-based community code 754 also includes a presentation process for presenting associate-based community recommendations to the customer ("presentation process"). In one embodiment, the presentation process is performed dynamically by the merchant web site 130 in response to a request for a web page that includes community recommendation information. Various embodiments of a presentation process are illustrated in FIG. 11 and FIG. 12.

Figure 11:
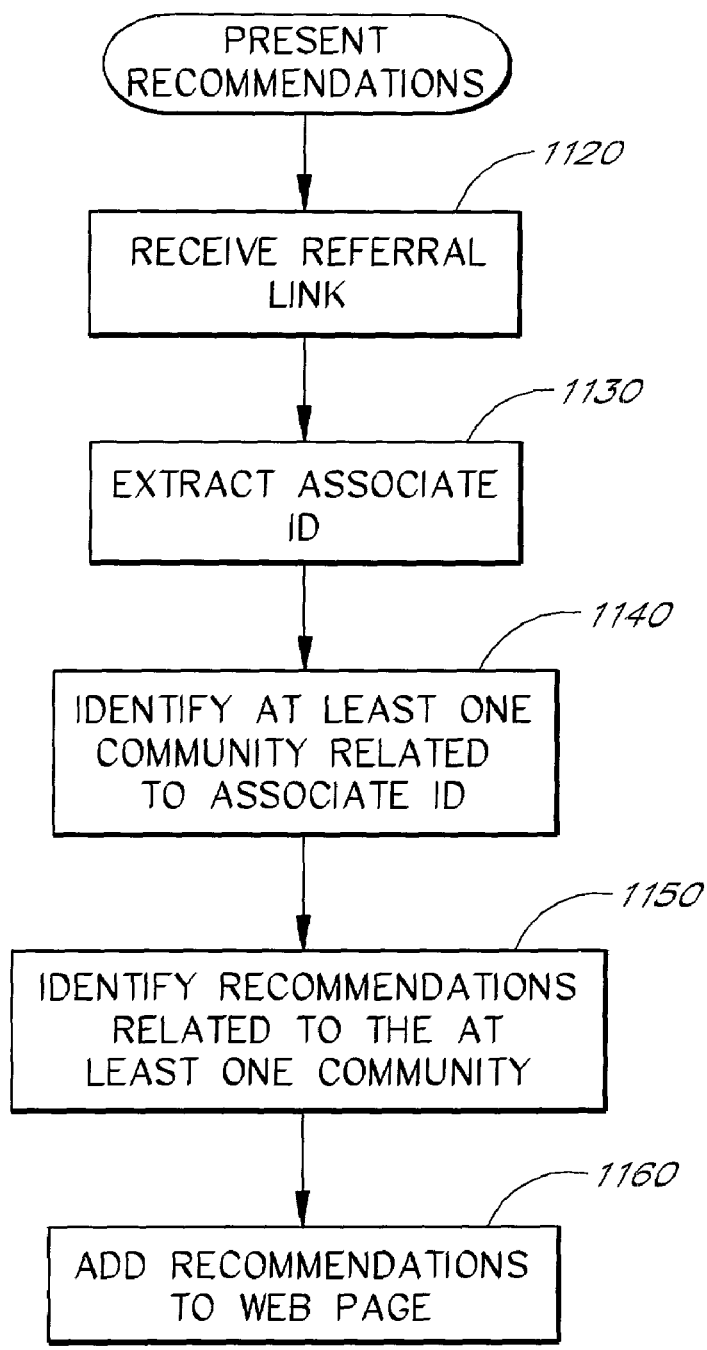
FIG. 11 illustrates a flow diagram of one embodiment of a presentation process.
Figure 12:
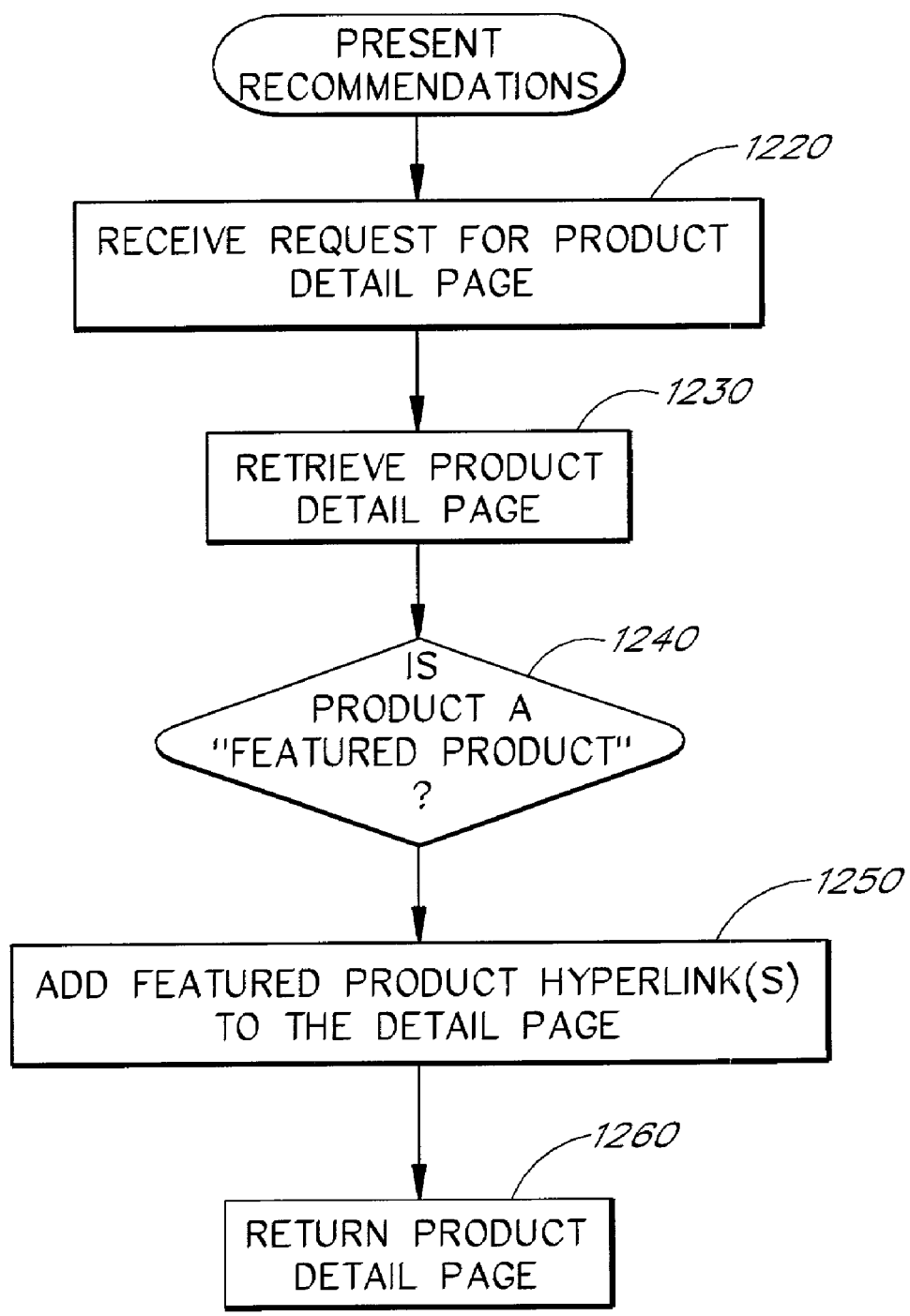
FIG. 12 illustrates a flow diagram of an additional embodiment of a presentation process.

With reference to FIG. 11, the presentation process receives a referral link (block 1120). As previously discussed, the referral link may be a hyperlink to a web page of a merchant web site 130 that enables the customer to select products for prospective purchase. In one embodiment, the referral link includes the customer ID (if available), the product ID and the associate ID.

After receiving the referral link, the presentation process proceeds to the next state and extracts the associate ID (block 1130). As discussed, the associate ID represents and/or corresponds to one of the merchant's associates. Proceeding to the next state, the presentation process identifies at least one community related to the associate (block 1140). The presentation process may look up the associate in the associate database 764, the community database 766, and/or another database to determine whether there are any communities related to the designated associate. If there are communities related to the designated associate, the customer may be "assigned" to the community, in real time, such as by updating the customer's profile with the referring associate's ID. In other embodiments, the customer may not be "assigned" to a community until the customer has explicitly agreed to the assignment. In addition, the customers may be assigned offline to communities on a periodic basis using the assign customers process discussed above.

Once a customer is "assigned" to one or more communities, becoming a member of the community, various web pages of the merchant web site 130 may thereafter be customized with community-specific content either automatically or after receiving consent from the customer. Furthermore, the assignment may remain persistent from browsing session to browsing session. It is recognized that in other embodiments, the assignment may be temporary.

If the associate belongs to more than one community, the presentation process may present to the customer information for a subset of the related communities or for all of the related communities. In other embodiments, however, the process may select one or more communities to be related to the associate. Further, the presentation process may present the customer with a list of recommended products for each community, for one or more communities, as well as any combination of the above. FIG. 2 illustrates an embodiment in which a separate list for each associate-based community has been presented. While the lists in FIG. 1 include the same book, it is recognized that in some embodiments, the lists may be compared and processed such that there are no redundant products in the two or more lists and/or the product of the product detail page does not appear in the list.

Proceeding to the next state, the presentation process identifies recommendations related to at least one community (block 1150). In one embodiment, recommendations related to the community may be generated and stored according to the table generation process discussed above. It is recognized that the recommendations may be grouped by product (e.g., top selling books, top selling videos, top selling DVDs, etc.) and/or the recommendations may be grouped together (e.g., top selling products). Further, the presentation process may combine the recommendations from one or more communities to form one composite list, present one or more composite lists, and/or provide a set of lists.

It is recognized that, in other embodiments, the process may limit the number of lists the top X communities (where X is an integer), combine two or more of the communities to form one community so that there are at most X communities, and so forth. A variety of combinations may be used. The presentation process may then proceed to the next state and add the one or more lists of recommendations to the web page (block 1160). The recommendations may be added as a separate section in the same window, in a separate frame, and/or the recommendations may be placed in their own window (e.g., a pop up window) or in any other type of user interface feature that is well known in the art.

Another embodiment of a presentation process is illustrated in FIG. 12. In FIG. 12, a link to the associate-based communities pages (and associated lists of recommendations) is included as part of the product detail page 310.

The presentation process receives a product detail page request (block 1220). Proceeding to the next state, the presentation process retrieves the product detail page (block 1230). The presentation process determines whether the product that corresponds to the product detail page is "featured" in any of the associated-based community recommendations lists (block 1240) such as by querying the community recommendations data 768. If the product is featured, the presentation process may add the featured product hyperlink(s) to the web page (block 1250). The featured product hyperlink may be implemented as a URL that, when selected, directs the customer to the web page of the interest group that includes the product in its recommendation list. Proceeding to the next state, the presentation process returns the product detail web page or its corresponding reference (block 1260).

FIG. 3 illustrates a sample product detail page for a book entitled "Raising the Bar: The Championship Years of Tiger Goods." The sample product detail page includes a product hyperlink "Golf Enthusiasts (#3)" 318 informing the customer that this product is #3 in the interest group "Golf Enthusiasts." Upon selection, the product hyperlink takes the customer to the "Golf Enthusiasts" page illustrated in FIG. 4. The sample web page of FIG. 4 includes the book "Raising the Bar: The Championship Years of Tiger Woods" as the third top selling book among members of the Golf Enthusiasts community.

It is recognized that FIG. 11 and FIG. 12 illustrate various embodiments of a presentation process and that other embodiments may be used. For example, the presentation process may combine lists select the "best" list(s), provide the customer access to other lists, and so forth. In addition, the presentation process may also "push" recommendations to associate web sites 120 on a periodic basis (e.g., hourly, daily, weekly, etc.) and/or in response to a request for the recommendations. Furthermore, the request may come from the customer computer 110, the associate web site 120, as well as a third party.

VI. Additional Embodiments

It is recognized that other types of communities may be automatically formed using other information about the customers, such as for example, activity that evidences a user's interest in a particular item, product, or group of products. For example, one community may be formed by grouping together customers that bought items for a particular charity, customers who participated in the discussion board for a particular group, customers who bid for the same item, and so forth.

VII. Conclusion

Associate-based communities enable merchant web sites 130 to create, manage, and track interest-based communities using information about associates that refer customers to the merchants. Furthermore, information relating to the referring associate may be used to automatically determine customer interests enabling the system to provide targeted and relevant content to unknown or unrecognized customers.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

APPENDIX

1. Overview

The censored chi-square recommendation algorithm constructs a set of candidate recommendations for a predefined group of customers. It then conducts a statistical hypothesis test to decide whether or not these candidate recommendations are really a result of group preferences which differ from the preferences of the overall customer base. If the conclusion is that group preferences do differ significantly from overall customer preferences, the recommendations are presented to the group.

The inputs to the censored chi-square algorithm are the purchases made by the group (over some time period) and the purchases made by all customers (over the same time period). Other types of events, such as item viewing, downloading and rating events, can additionally or alternatively be used.

The purchases of the entire customer base are used to formulate expectations about how many customers in the group will have purchased each available item, given the total number of purchases by the group. The "group purchase count" for each item is the number of customers in the group who actually purchased the item. The candidate recommendations are first restricted to be those items whose group purchase counts exceeded expectations. Of these candidates, only those items with the largest group purchase counts are then retained. These final candidates are sorted according to how much their group purchase counts exceeded expectations (subject to a normalization). The values used to sort the candidates are called the "residuals".

These residuals form the basis of a test statistic which leads to an estimate of the probability that expectations about the group are the same as expectations about all customers. If this probability is low, it is inferred that the group's preferences are significantly different from the preferences of all customers, and the recommendations are returned as output. If the probability is high, on the other hand, then little evidence exists to suggest the group's preferences differ from overall preferences, so no recommendations are returned.

2. Algorithm for Constructing Censored Chi-Square Recommendations

Let A be the set of customers in the purchase circle (community) under consideration.

With respect to the minimum lookback horizon L such that $S\_\{0.99\}$ (defined below) is at least 5:

Define $P=\{<c, i>: c \in A$ and c purchased item i at least once between today and L periods ago$\}$ Let $|P|=n$.

Define $I=\{i:$ there exists a $c \in A$ such that $<c, i>\in P\}$

Define observed counts, expected counts, residuals and standardized residuals as follows:

$o(i)=|\{c: c \in A$ and c purchased i within L$\}|, i \in I$ $e(i)=n*phat\_i$, $phat\_i$ is the estimated purchase probability for I, $i \in I$ $r(i)=o(i)-e(i), i \in I$ $r\_s(i)=r(i)/sqrt(e(i)), i \in I$ Define $I^*\subset I=\{i: i \in I$ and $r(i)>0\}$ Let S be the image of $I^*$ under $o(i)$. Let $|S|=d$.

Let $S\_(1), S\_(2), \ldots, S\_(d)$ be the order statistics of S. thus $S\_(d)$ is the number of distinct customers who purchased the most-purchased (positive-residual) item. Note ties are common, so that a subsequence $S\_(i), S\_(i+1), \ldots, S\_(i+j)$ may have all elements equal.

Let $S\_\{c\}$, $0 <= c <= 1$, be the cth quantile of S, that is, (100*c) % of the other elements in S are less than or equal to $S\_\{c\}$. Interpolate and break ties as necessary to determine $S\_\{c\}$.

Let SR be the set of standardized residuals which correspond to elements of S that are $>= S\_\{0.99\}$.

Let $|SR|=m$.

Let $SR\_(1), \ldots, SR\_(m)$ be the order statistics of SR.

Call the desired number of recommendations r. Then the order statistic index of the final recommendation candidate is $r^* = \max(m-r+1, 1)$.

Compute $T = \sum\_\{i=r^*\}^m SR\_(i)^2$

Compute the p-value of T, i.e. $Pr(X > T)$ where $X \sim cX^2(n, r^*)$.

If the p-value achieves the desired significance level, then the recommended items for the circle, in order, are $SR\_(m), SR\_(m-1), \ldots, SR\_(r^*+1), SR\_(r^*)$.

3. Estimating the Sampling Distribution of the Censored Chi-Square Statistic To construct a numerical approximation of the censored chi-square sampling distribution under the null hypothesis, we employ a statistical resampling technique called the bootstrap. The idea is straightforward. We create a group of customers by simple random sampling with replacement from the entire customer base. By construction, the expected purchase allocations of such a group follow the probability model of our null hypothesis. We emphasize that this is simply an algebraic consequence of the method used to fit the null model, and in fact the linearity of expectation guarantees that it holds algebraically regardless of any interdependencies our model ignored in the joint distribution over purchase probabilities.

We then compute the censored chi-square statistic for this random group, as presented above. We can think of the value so obtained as an approximate sample drawn from the censored chi-square's null distribution. By repeatedly (1) constructing a set of customers randomly and (2) computing its censored chi-square statistic, we approximate the so-called empirical distribution of the $cX^2$ under the null hypothesis. Under mild to moderate probabilistic conditions, the empirical distribution converges to the true null distribution of the statistic. Thus an approximate 100(1-alpha) % significance level test for circle idiosyncrasy can be conducted by comparing the circle's $cX^2$ statistic value to the (alpha)th quantile of the bootstrapped empirical distribution. Also note that, as a sum of (theoretically) independent random variables, the $cX^2$ sampling distribution should converge asymptotically to the normal distribution as the number of observations over which the statistic is computed grows large. We can determine when application of the normal theory is feasible by testing goodness-of-fit of the bootstrapped distribution to the normal, for example using the Kolmogorov-Smirnoff statistic.

Under the assumptions of the null hypothesis, the value of the $cX^2$ can be shown to grow linearly in the total purchase count of the circle (community) as well as the number of items to recommend (i.e. terms in the $cX^2$ summation). Since the purchase probabilities are constants under the null hypothesis, these are the only two variables with which the $cX^2$ grows. So in theory we would want to bootstrap a distribution for each possible $<n, r>$ pair, where n is the circle's purchase count and r the number of recommended items. In practice, both n and r are random variables which depend on the particular set of random customers we assemble at each iteration of the bootstrap. So we bootstrap various random group sizes at various lookback horizons, then recover the sampling distributions from the $<n, r>$ values implicitly obtained in the course of each iteration. We can then construct approximate empirical distributions for $<n, r>$ intervals which are large enough to contain enough observations for us to get useful convergence to the true null distribution. With these parameterized approximate sampling distributions available, we conduct a hypothesis test using the sampling distribution whose $<n, r>$ interval contains the values of n and r actually obtained for the circle being tested.

IV. Determination of Optimal Lookback Horizon

Before testing the hypothesis that a particular purchase circle follows the probability model to allocate its purchases across items, we decide how much of the circle's available transaction data to use in computing the censored chi-square test statistic. We choose to utilize data looking sequentially backwards in time, without weighting observations. Thus the question of how much data to use is equivalent for our purposes to asking how many prior days of data to include in the computation. We refer to this number of days as the lookback horizon associated with the purchase circle.

In general, the power of a test statistic (the probability the test statistic will detect deviations from the null hypothesis) is a nondecreasing function of the amount of data provided, so using all available data normally won't harm our statistical inferences. There are other drawbacks in our situation, however. First, the stationarity assumption behind the purchase probability estimates is at best only locally correct. The further back in time we look, the more likely it is that nonstationarity in the purchase probabilities will manifest itself in our hypothesis tests. Since this nonstationarity impacts the bootstrap as well, it is actually a pervasive problem that can't be circumvented with simple resampling, and it will tend to cause us to detect circle idiosyncrasies where none actually exist.

Second, without researching the power function of the censored chi-square, we cannot make any statements about the expected power benefits of incrementally larger datasets. In light of this, it makes sense to let computational efficiency dictate the sizes of the datasets used in hypothesis testing. In other words, knowing nothing about the relative value of larger datasets, we will use the smallest dataset which allows a given purchase circle to satisfy the reasonability criterion. Currently this means that the observed count for the 99th percentile of the circle's positive-residual items, ranked by observed count, must be at least 5.

Determining the minimum lookback horizon consistent with this constraint would in general require repeated computations at successively longer horizons for a particular circle. Instead, for computational efficiency, we will forecast a horizon that has high probability of satisfying the constraint, accepting that in expectation some small percentage of circles will fail to satisfy it. The forecast is produced as a side effect of the bootstrap computation (see above). Each random group size we bootstrap over will have iterations at many horizons. At each horizon, some fraction of the iterations will fail the reasonability criterion. We record all such failures. Roughly speaking, the fraction of failures should decrease as lookback horizon increases. Given a purchase circle whose minimum lookback horizon we want to forecast, we find the bootstrap group size it is close to, then pick the shortest horizon which had an acceptable failure rate. If no bootstrapped horizon had an acceptably low rate, we choose the longest horizon and accept that many idiosyncratic circles of that size will escape detection by failing the reasonability criterion.

What is claimed is:

1. A computer-implemented method, comprising:
   tracking referrals of users from each of a plurality of referring web sites to a target web site that hosts an electronic catalog of items, said referrals resulting from user selections of links provided on the referring web sites;
   identifying a group of users referred to the target web site by a selected subset of said plurality of referring web sites, said group of users comprising a plurality of users, and representing a subpopulation of a general user population of the target web site;
   collecting user activity data reflective of preferences of particular users for particular items represented in the electronic catalog of items, said user activity data encompassing actions of both members and non-members of said group of users;
   identifying a set of items that correspond to group preferences of said group of users, wherein the set of items is identified based on the collected user activity data of both the members and the non-members of said group of users; and
   causing the set of items to be displayed (a) on the target web site to users who are referred thereto from a referring web site in said subset of referring web sites, and/or (b) on a referring web site in said subset of referring web sites.

2. The method of claim 1, wherein identifying the set of items comprises programmatically analyzing the collected user activity data of the members and non-members of the group to identify items that are significantly more popular among the group of users than in the general user population.

3. The method of claim 1, wherein identifying the set of items comprises programmatically analyzing the collected user activity data of the members and non-members of the group to identify items for which the group's preferences are significantly greater than the general user population's preferences.

4. The method of claim 1, wherein the user activity data comprises data descriptive of item purchases made by users.

5. The method of claim 1, wherein the user activity data comprises user-specific item viewing histories.

6. The method of claim 1, wherein the method comprises causing the set of items to be displayed on the target web site to users who are referred thereto from a referring web site in said subset of referring web sites.

7. The method of claim 1, wherein the method comprises causing the set of items to be displayed on a page that is initially presented to a user when the user is referred to the target web site from a referring web site in said subset of referring web sites.

8. The method of claim 7, wherein the page is a product detail page of the target web site.

9. The method of claim 1, wherein the method comprises causing the set of items to be displayed on a referring web site in said subset of referring web sites.

10. The method of claim 1, wherein the set of items is caused to be displayed together with a community name associated with said group of users.

11. The method of claim 1, wherein the subset of referring web sites consists of a single referring web site.

12. The method of claim 1, wherein the subset of referring web sites includes one or more associate web sites.

13. The method of claim 1, wherein the subset of referring web sites consists of a plurality of referring web sites that are associated with a common topic.

14. The method of claim 1, wherein the items include books that are available for purchase from the target web site.

15. The method of claim 1, further comprising repeating the method for each of a plurality of additional groups of users, each group corresponding to a different respective subset of the plurality of referring web sites, and corresponding to a different respective topic.

16. A computer system, comprising:
   a referral tracking system that tracks referrals of users from a plurality of referring sites to a target site, said target site including an electronic catalog of items;
   a data repository that stores user activity data reflective of user actions performed with respect to items represented in the electronic catalog, said user activity data reflective of user preferences for particular items; and
   a recommendations service configured to (a) identify a group of users that have been referred to the target site by a selected subset of the referring sites, (b) analyze the user activity data of both members and non-members of said group to identify a set of items that are significantly more popular in the group than in a general user population of the target site, and (c) cause the identified set of items to be suggested to users that visit a referring site in said subset of referring sites.

17. The computer system of claim 16, wherein the user activity data identifies item purchases made by particular users.

18. The computer system of claim 16, wherein the user activity data comprises user-specific item viewing histories.

19. The computer system of claim 16, wherein the recommendations service is configured to cause the set of items to be displayed on the target site to users who are referred thereto from a referring site in said subset of referring sites.

20. The computer system of claim 16, wherein the recommendations service is configured to cause the set of items to be displayed on a page that is initially presented to a user when the user is referred to the target site from a referring site in said subset of referring sites.

21. The computer system of claim 20, wherein the page is a product detail page of the target site.

22. The computer system of claim 16, wherein the recommendations service is configured to cause the set of items to be displayed on a referring site of said subset of referring sites.

23. The computer system of claim 16, wherein the recommendations service is configured to cause the set of items to be displayed together with a community name associated with said group of users.

24. The computer system of claim 16, wherein the subset of referring sites consists of a single referring site.

25. The computer system of claim 16, wherein the subset of referring sites includes a plurality of referring sites associated with a common area of interest.

26. The computer system of claim 16, wherein the subset of referring sites includes one or more associate sites.

27. The computer system of claim 16, wherein the items include books that are available for purchase from the target site.

28. The computer system of claim 16, wherein the recommendations service is configured to identify items that are unusually popular in each of a plurality of groups, each group corresponding to a different respective subset of the referring sites, and corresponding to a different area of user interest.

* * * * *